(12) United States Patent
Sugita

(10) Patent No.: US 10,495,861 B2
(45) Date of Patent: Dec. 3, 2019

(54) ZOOM LENS AND IMAGE PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/924,748

(22) Filed: Mar. 19, 2018

(65) Prior Publication Data

US 2018/0275370 A1 Sep. 27, 2018

(30) Foreign Application Priority Data

Mar. 23, 2017 (JP) ................. 2017-057116

(51) Int. Cl.
*G02B 15/14* (2006.01)
*G02B 9/62* (2006.01)
*H04N 5/232* (2006.01)
*G02B 27/00* (2006.01)
*G02B 9/64* (2006.01)
*G02B 15/177* (2006.01)
*G02B 27/64* (2006.01)

(52) U.S. Cl.
CPC .......... *G02B 15/1465* (2019.08); *G02B 9/62* (2013.01); *G02B 9/64* (2013.01); *G02B 15/14* (2013.01); *G02B 15/177* (2013.01); *G02B 27/0025* (2013.01); *G02B 27/646* (2013.01); *H04N 5/23296* (2013.01)

(58) Field of Classification Search
CPC .................................... G02B 15/1465
See application file for complete search history.

(56) References Cited

U.S. PATENT DOCUMENTS

| 5,835,272 | A | 11/1998 | Kodama |
| 6,285,509 | B1 * | 9/2001 | Nakayama ........... G02B 15/177 |
| | | | 359/676 |
| 9,110,278 | B2 | 8/2015 | Sugita |
| 9,250,424 | B2 | 2/2016 | Sugita |
| 9,268,118 | B2 | 2/2016 | Sugita |

(Continued)

FOREIGN PATENT DOCUMENTS

| JP | H10-39210 A | 2/1998 |
| JP | 2008-046208 A | 2/2008 |
| JP | 2012-247687 A | 12/2012 |

*Primary Examiner* — Darryl J Collins
(74) *Attorney, Agent, or Firm* — Carter, DeLuca & Farrell LLP

(57) ABSTRACT

Provided is a zoom lens including, in order from an object side to an image side: a first lens unit having a negative refractive power; a second lens unit having a positive refractive power; a third lens unit having a negative refractive power; a fourth lens unit having a positive refractive power; and a rear lens group including at least one lens unit, the first lens unit, the second lens unit, the third lens unit, the fourth lens unit, and the rear lens group having an interval between each pair of adjacent lens units changed for zooming. The third lens unit is configured to move for focusing, and at least a part of the fourth lens unit forms a lens system IS, which is configured to move in a direction including a component of a direction perpendicular to an optical axis for image stabilization.

19 Claims, 16 Drawing Sheets

(56) References Cited

U.S. PATENT DOCUMENTS

| | | |
|---|---|---|
| 9,268,119 B2 | 2/2016 | Sugita |
| 9,465,203 B2 | 10/2016 | Sugita |
| 9,575,391 B2 | 2/2017 | Sugita |
| 9,638,904 B2 | 5/2017 | Sugita |
| 9,933,603 B2 | 4/2018 | Sugita |
| 2009/0002842 A1* | 1/2009 | Souma ................. G02B 15/177 359/684 |
| 2012/0069441 A1 | 3/2012 | Fujimoto et al. |
| 2014/0036137 A1* | 2/2014 | Inoue ..................... G02B 15/15 348/345 |
| 2014/0085513 A1* | 3/2014 | Tashiro ................. G02B 13/18 348/240.3 |
| 2014/0211082 A1* | 7/2014 | Imaoka ................ G02B 15/177 348/373 |
| 2017/0242228 A1 | 8/2017 | Sugita |
| 2017/0322399 A1 | 11/2017 | Sugita |
| 2017/0351113 A1 | 12/2017 | Inoue et al. |

\* cited by examiner

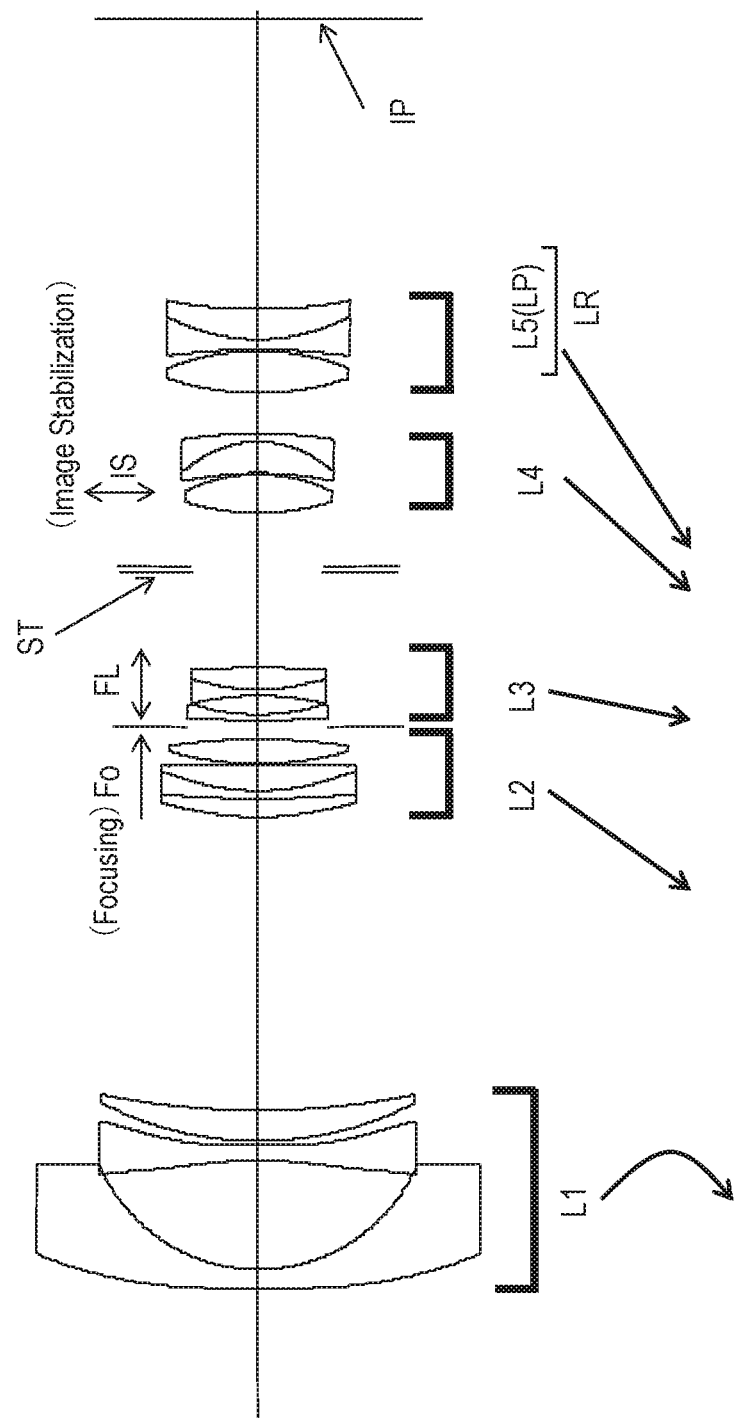

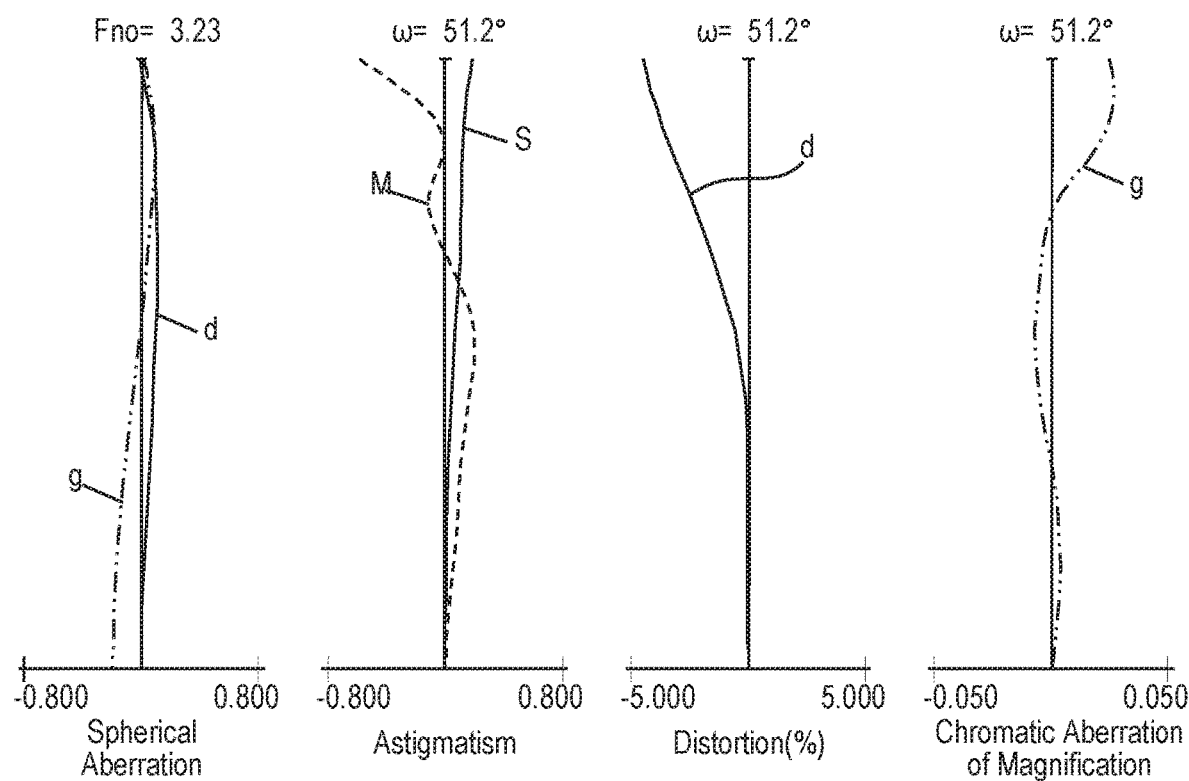
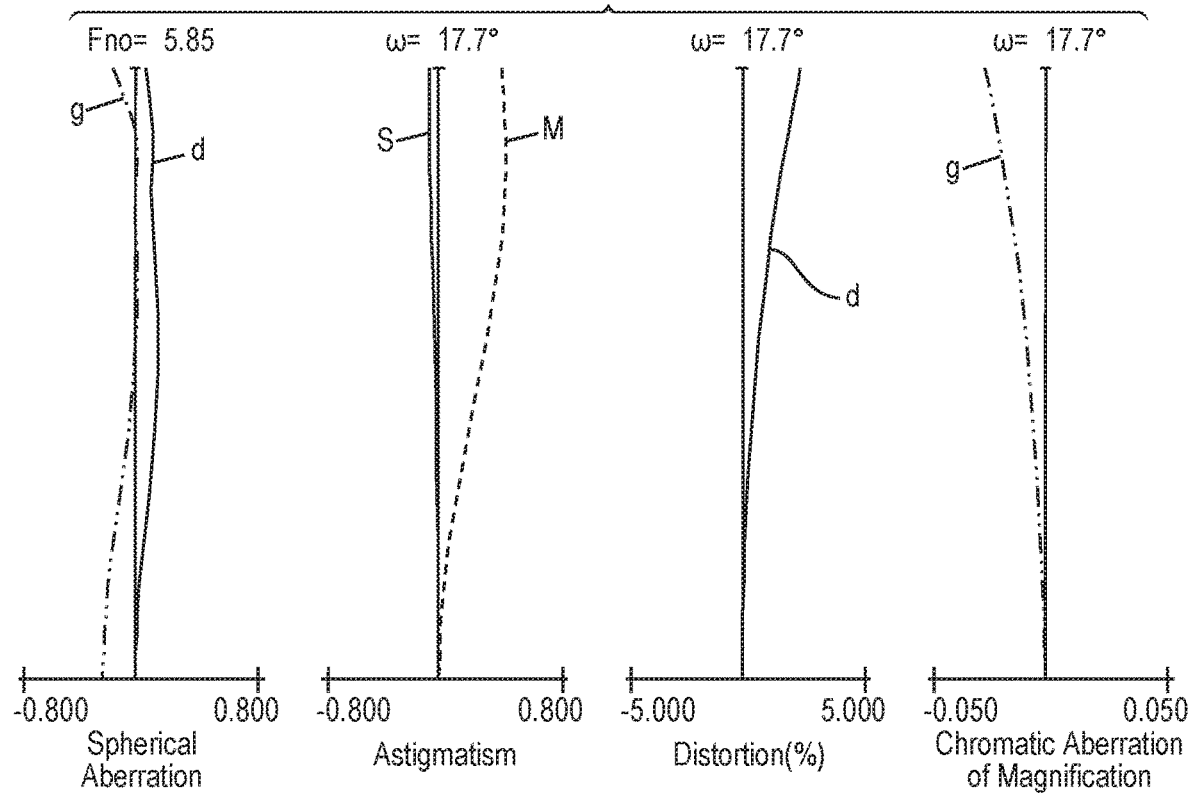

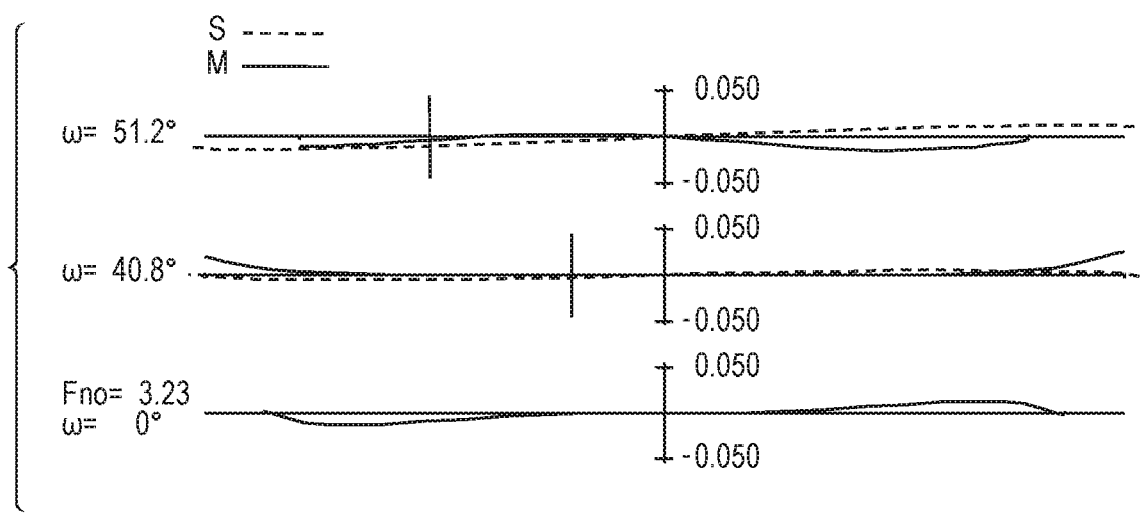
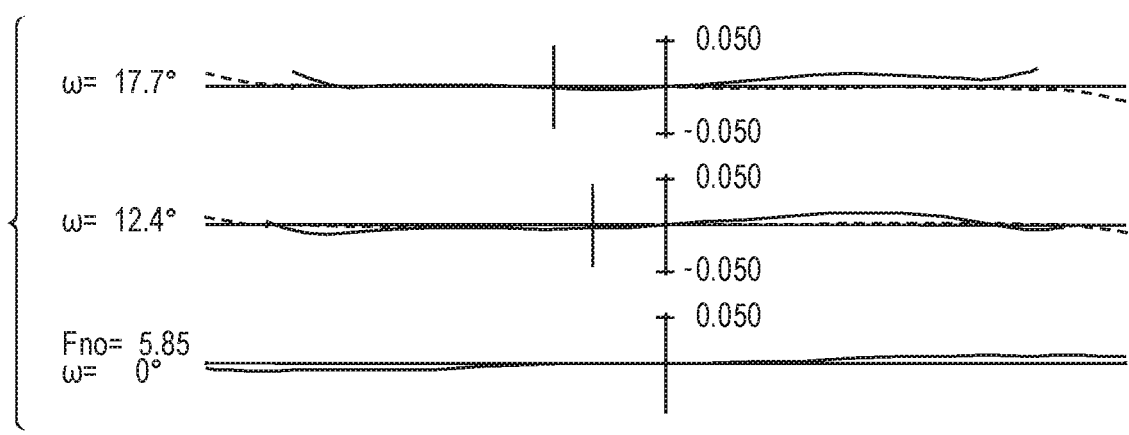

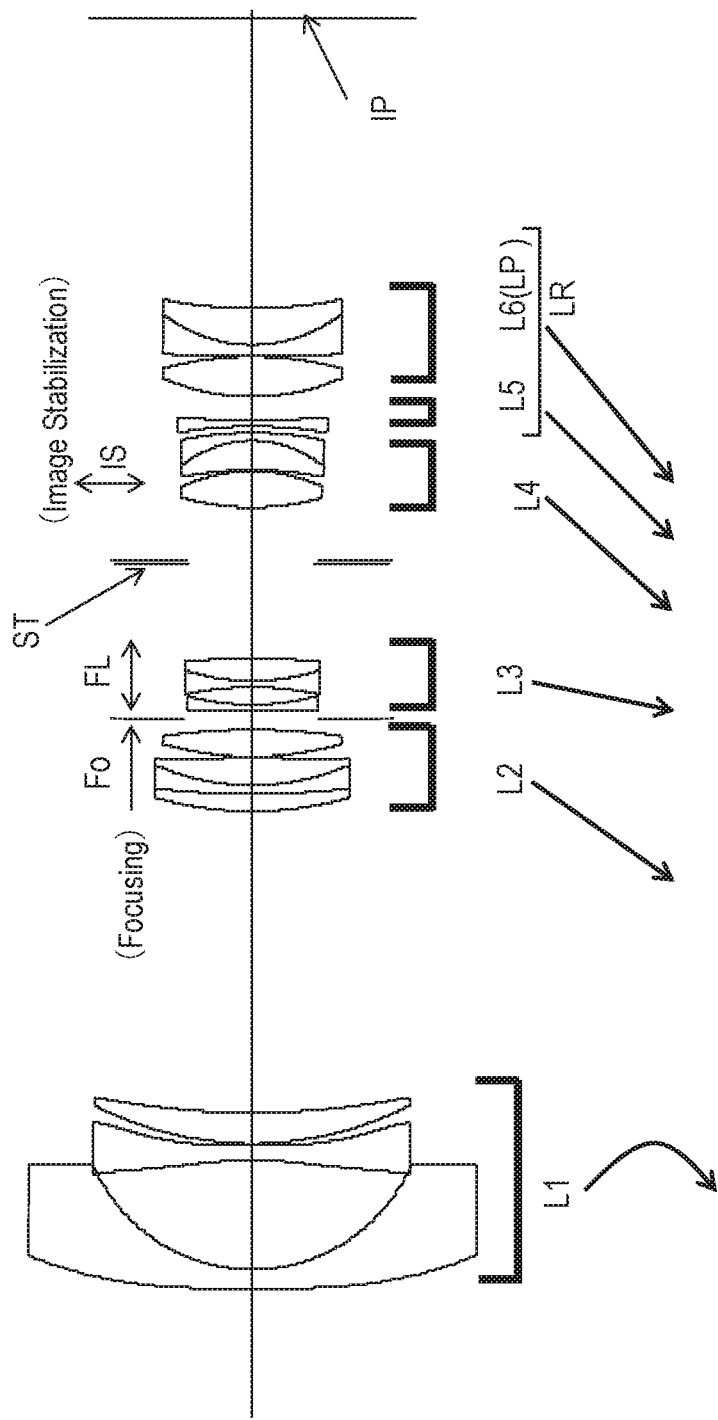

ZOOM LENS AND IMAGE PICKUP APPARATUS

BACKGROUND OF THE INVENTION

Field of the Invention

The present invention relates to a zoom lens and an image pickup apparatus.

Description of the Related Art

Heretofore, an image pickup optical system used with an image pickup apparatus (camera) is required to be a zoom lens having a wide angle of view so as to encompass a wider range in one image, and having high optical performance over the entire zoom range and all object distances. The image pickup optical system is also required to have an image stabilization function for suppressing degradation of an image due to image blur caused by an oscillation, for example, hand shake at the time of photography, so as to obtain a high-definition image, for example.

In the related art, as a zoom lens that easily achieves the wide angle of view, there is known a negative lead type zoom lens, in which a lens unit having a negative refractive power is located closest to an object side (Japanese Patent Application Laid-Open No. 2008-046208). There is also known a negative lead type zoom lens having a wide angle of view and an image stabilization function, with which a lens forming a part of an optical system is moved in a direction having a component in a direction perpendicular to an optical axis to correct the image blur (US Patent Application Publication No. 2012/0069441 and U.S. Pat. No. 5,835,272).

In each of Japanese Patent Application Laid-Open No. 2008-046208, US Patent Application Publication No. 2012/0069441, and U.S. Pat. No. 5,835,272, there is disclosed a four-unit zoom lens consisting of, in order from an object side to an image side, first to fourth lens units having negative, positive, negative, and positive refractive indices, in which an interval between each pair of lens units is changed to perform zooming. Of the related art, in US Patent Application Publication No. 2012/0069441, the entire third lens unit is configured to move in a direction substantially perpendicular to the optical axis to perform image stabilization. In US Patent Application Publication No. 2012/0069441, a lens unit forming a part of the third lens unit is configured to correct the image blur, and a lens unit forming a part of the second lens unit is configured to perform focusing.

In a negative lead type zoom lens, when an image pickup angle of view is about 100°, it becomes very difficult to correct various aberrations. For example, large decentering aberration is generated during the image stabilization, and it becomes very difficult to obtain the high optical performance.

SUMMARY OF THE INVENTION

It is an object of the present invention to provide a zoom lens having a wide angle of view, which generates small decentering aberration even during image stabilization, causes small variations in aberration during focusing, and easily provides high optical performance over the entire zoom range and all object distances.

According to one embodiment of the present invention, there is provided a zoom lens including, in order from an object side to an image side: a first lens unit having a negative refractive power; a second lens unit having a positive refractive power; a third lens unit having a negative refractive power; a fourth lens unit having a positive refractive power; and a rear lens group including at least one lens unit, the first lens unit, the second lens unit, the third lens unit, the fourth lens unit, and the rear lens group having an interval between each pair of adjacent lens units changed for zooming, in which at least the third lens unit is configured to move for focusing, and in which at least a part of the fourth lens unit is a lens system IS, which is configured to move in a direction including a component of a direction perpendicular to an optical axis for image stabilization.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens according to Embodiment 1 of the present invention.

FIG. 2A is an aberration diagram of the zoom lens according to Embodiment 1 when an object distance is infinite object distance at a wide-angle end.

FIG. 2B is an aberration diagram of the zoom lens according to Embodiment 1 when the object distance is infinite object distance at a telephoto end.

FIG. 4A is a lateral aberration diagram of the zoom lens according to Embodiment 1 when the object distance is infinite object distance with no shift at the wide-angle end.

FIG. 4B is a lateral aberration diagram of the zoom lens according to Embodiment 1 when the object distance is infinite object distance with no shift at the telephoto end.

FIG. 5 is a lens cross-sectional view of a zoom lens according to Embodiment 2 of the present invention.

DESCRIPTION OF THE EMBODIMENTS

Now, a zoom lens and an image pickup apparatus including the zoom lens according to Embodiments of the present invention are described with reference to the accompanying drawings.

A zoom lens according to each of Embodiments includes, in order from an object side to an image side: a first lens unit having a negative refractive power; a second lens unit having a positive refractive power; a third lens unit having a negative refractive power; a fourth lens unit having a positive refractive power; and a rear lens group including at least one lens unit. The first lens unit, the second lens unit, the third lens unit, the fourth lens unit, and the rear lens group have an interval between each pair of adjacent lens units changed during zooming. At least the third lens unit is configured to move during focusing, and at least a part of the fourth lens unit forms a lens system IS, which is configured to move so as to include a component in a direction perpendicular to an optical axis during image stabilization.

Figure 3A:
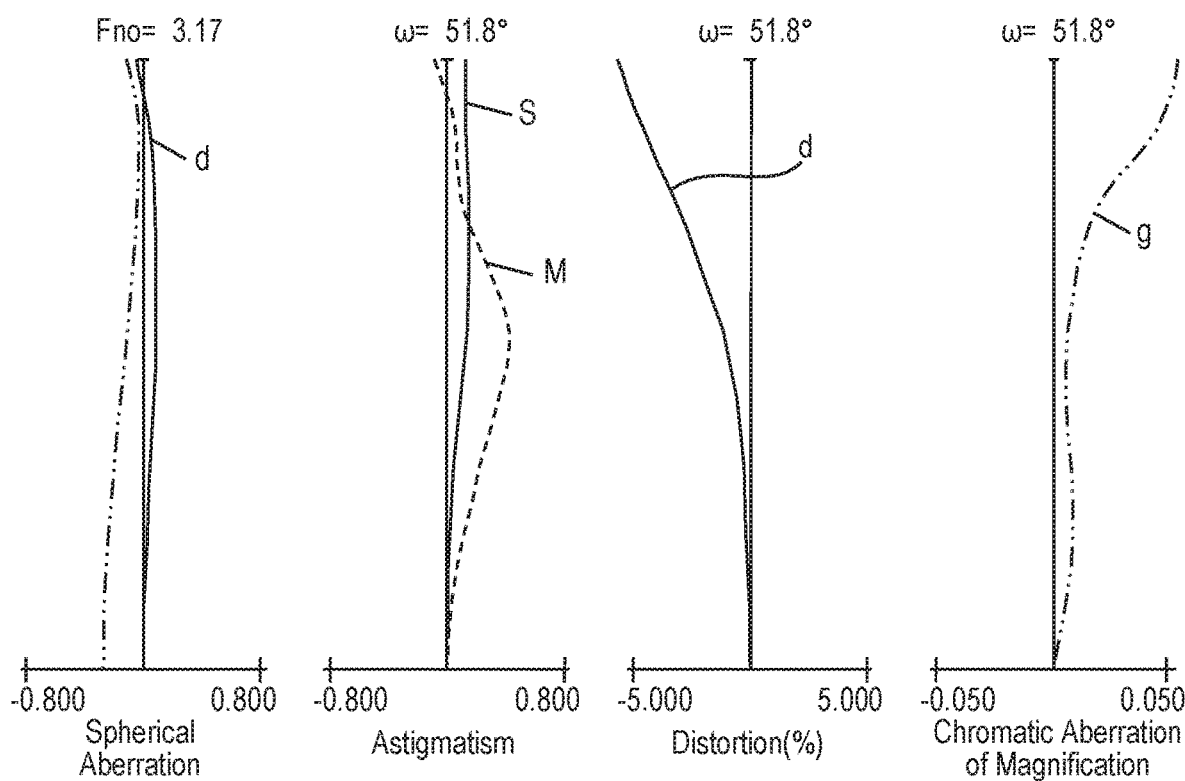
FIG. 3A is an aberration diagram of the zoom lens according to Embodiment 1 when an object distance is close proximity at the wide-angle end.
Figure 3B:
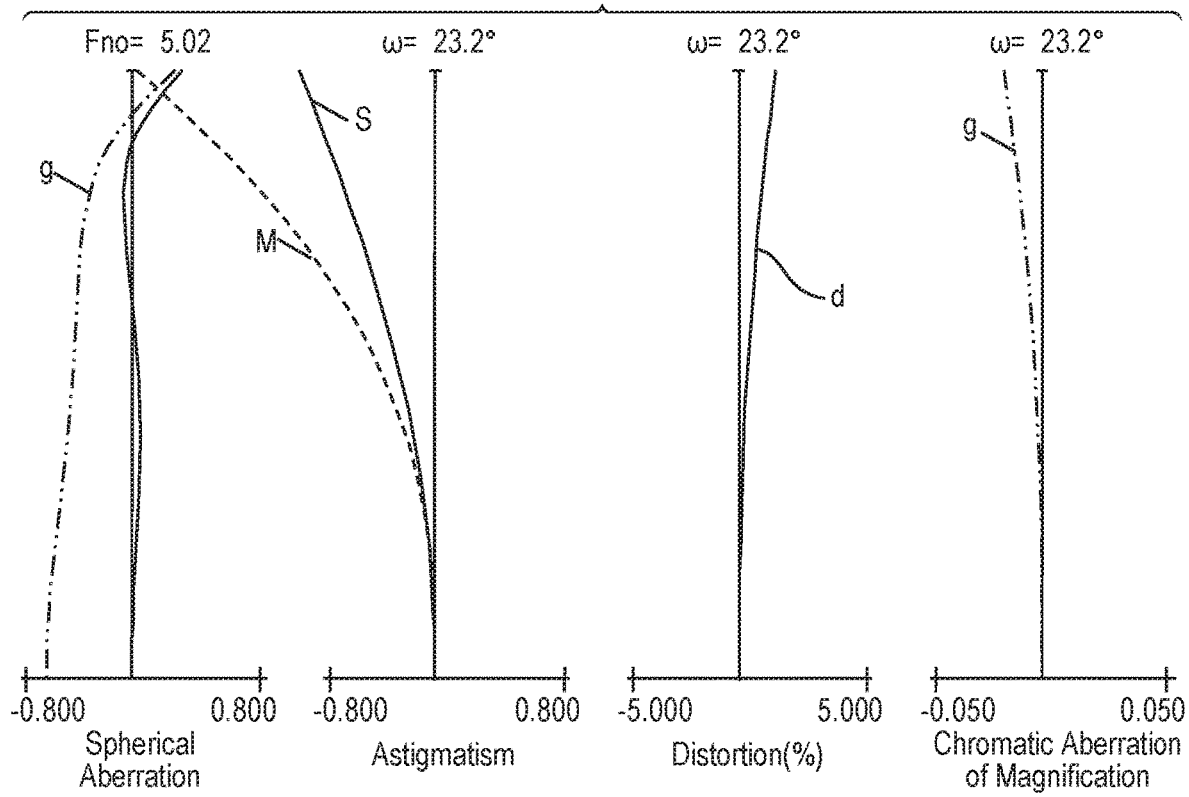
FIG. 3B is an aberration diagram of the zoom lens according to Embodiment 1 when the object distance is close proximity at the telephoto end.

FIG. 1 is a lens cross-sectional view of a zoom lens according to Embodiment 1 of the present invention at a wide-angle end. FIG. 2A and FIG. 2B are longitudinal aberration diagrams of the zoom lens according to Embodiment 1 when an object distance is infinite object distance at the wide-angle end and a telephoto end, respectively. FIG. 3A and FIG. 3B are longitudinal aberration diagrams of the zoom lens according to Embodiment 1 when an object distance is proximity (350 mm when Numerical Data, which is to be described later, is expressed in units of mm, the same applies to the following Embodiments) at the wide-angle end and the telephoto end, respectively.

Figure 4C:
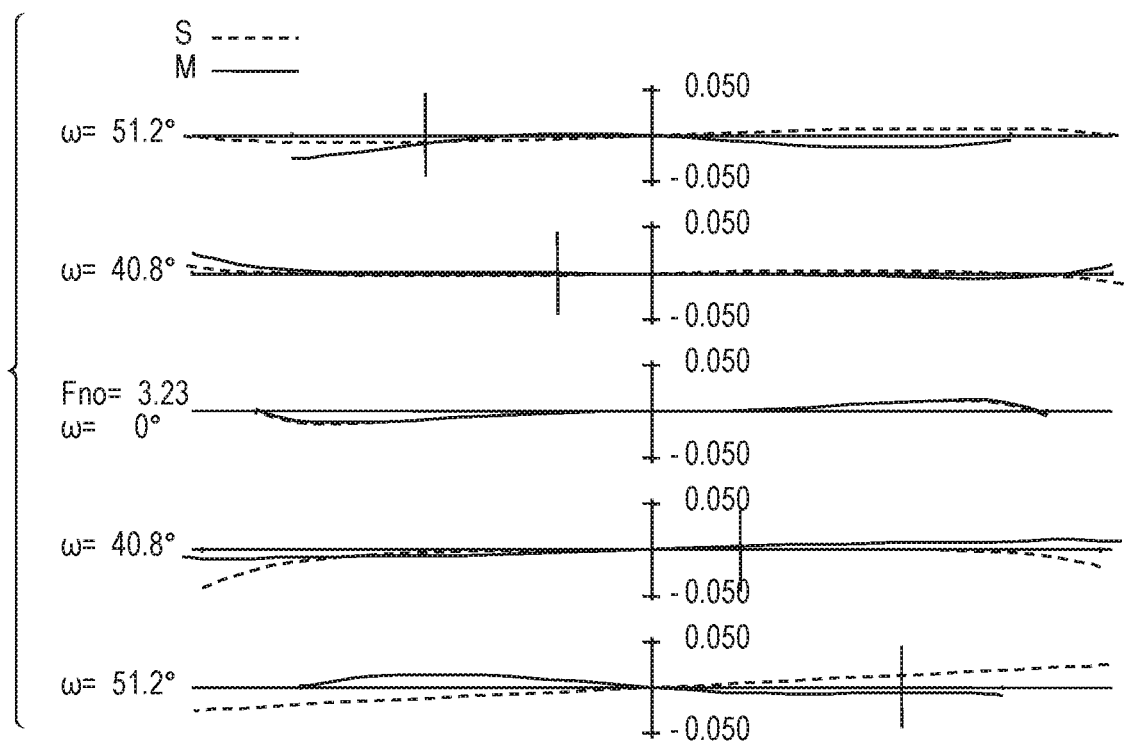
FIG. 4C is a lateral aberration diagram of the zoom lens according to Embodiment 1 when the object distance is infinite object distance with image stabilization of 0.3° at the wide-angle end.
Figure 4D:
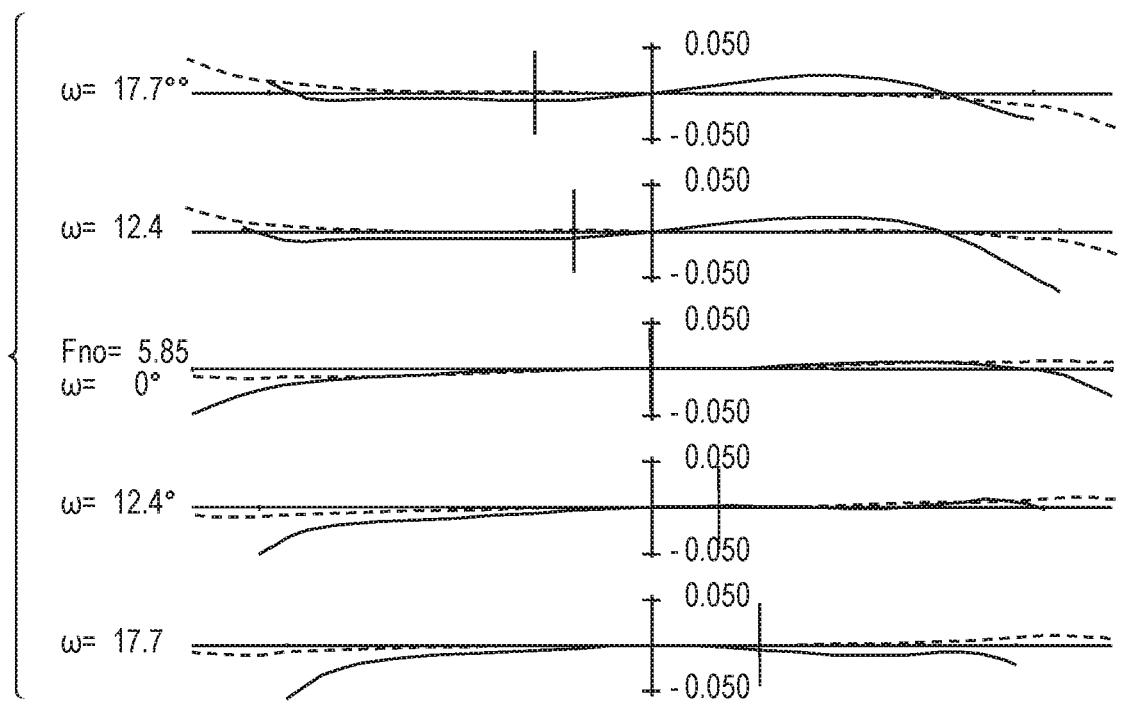
FIG. 4D is a lateral aberration diagram of the zoom lens according to Embodiment 1 when the object distance is infinite object distance with image stabilization of 0.3° at the telephoto end.

FIG. 4A and FIG. 4B are lateral aberration diagrams of the zoom lens according to Embodiment 1 when the object distance is infinite object distance with no shift (normal state) at the wide-angle end and with no shift at the telephoto end, respectively, during image stabilization. FIG. 4C and FIG. 4D are lateral aberration diagrams of the zoom lens according to Embodiment 1 with image stabilization of 0.3° at the wide-angle end and with the image stabilization of 0.3° at the telephoto end, respectively.

The phrase "with no shift" as used herein means performing no image stabilization.

Figure 6A:
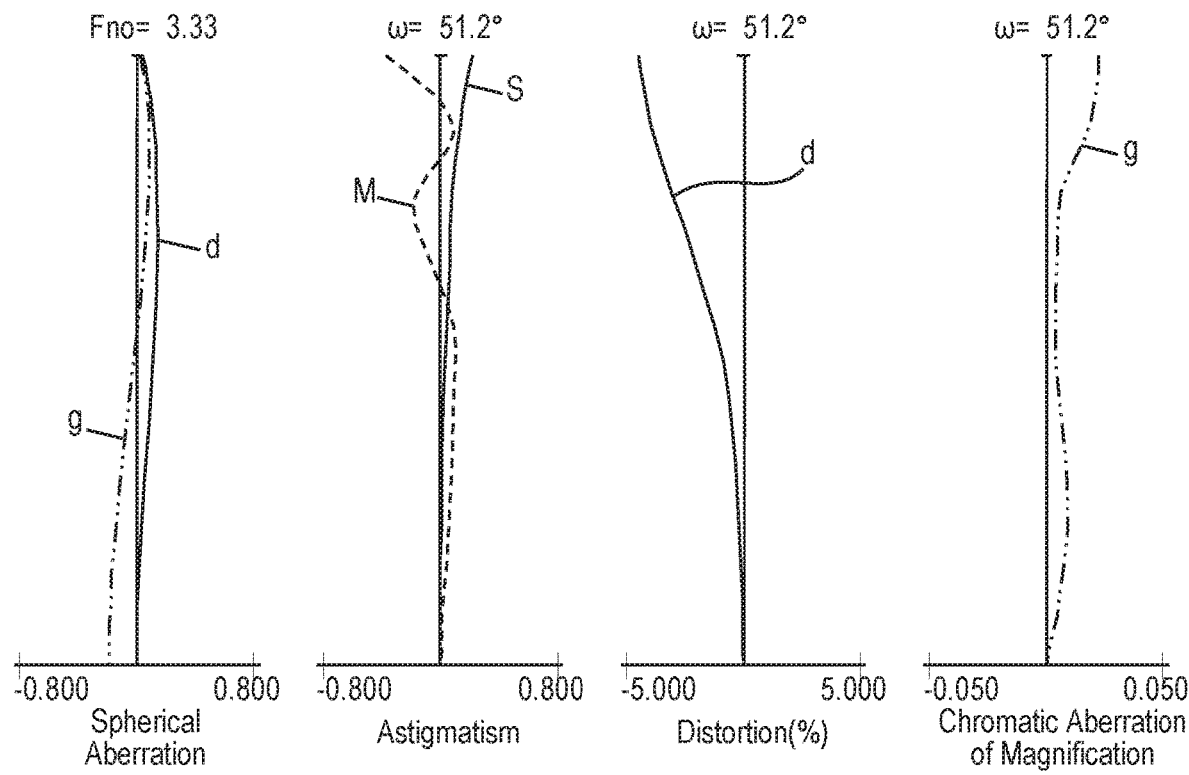
FIG. 6A is an aberration diagram of the zoom lens according to Embodiment 2 when an object distance is infinite object distance at a wide-angle end.
Figure 6B:
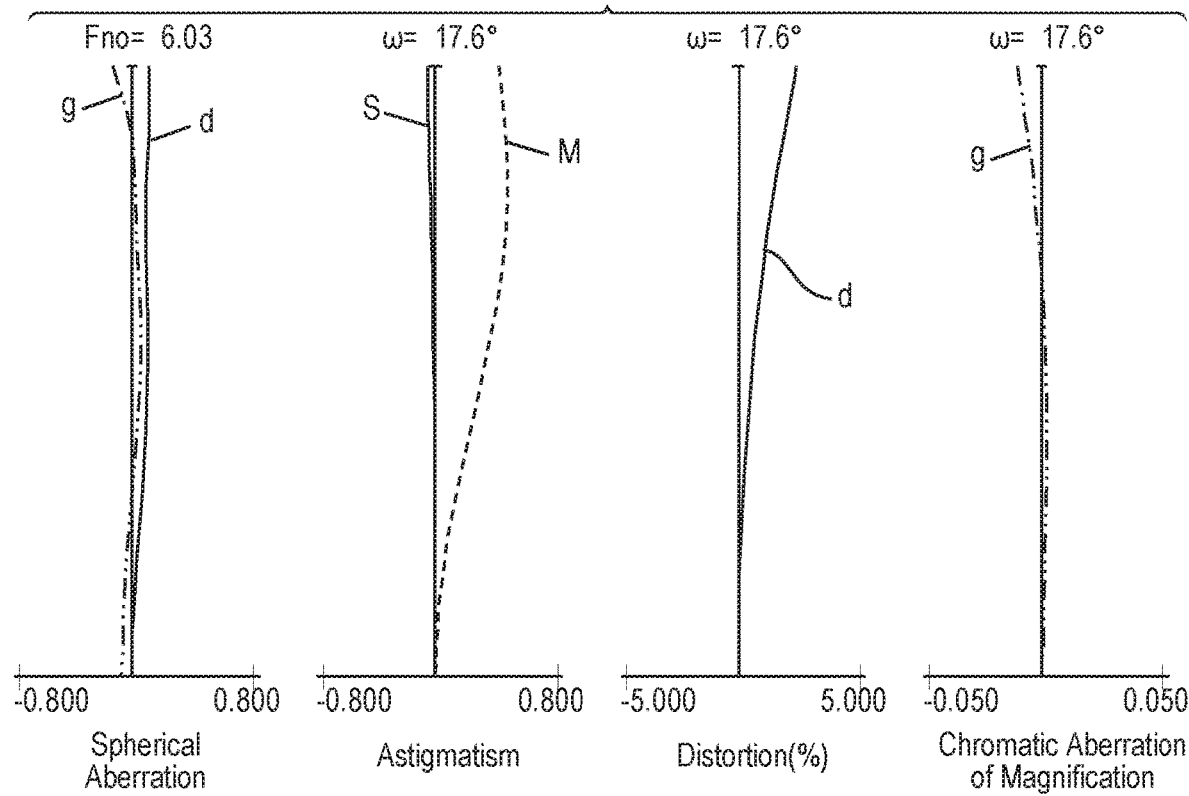
FIG. 6B is an aberration diagram of the zoom lens according to Embodiment 2 when the object distance is infinite object distance at a telephoto end.
Figure 7A:
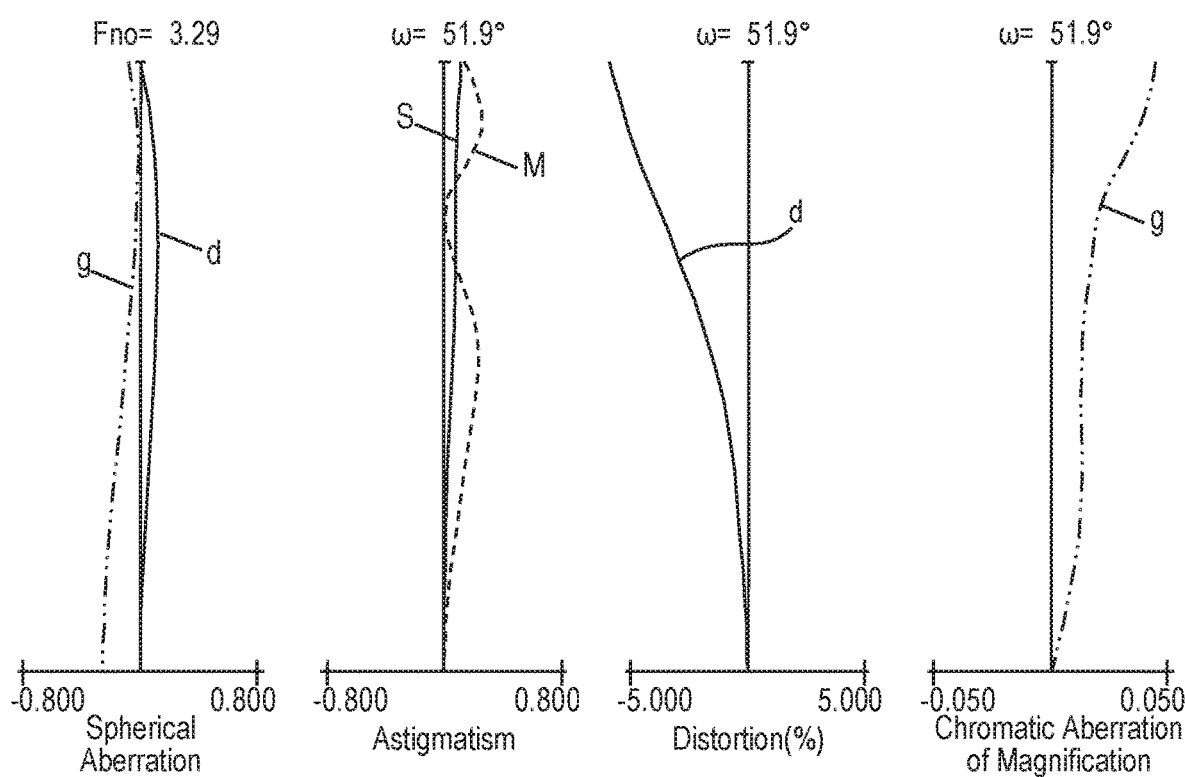
FIG. 7A is an aberration diagram of the zoom lens according to Embodiment 2 when an object distance is close proximity at the wide-angle end.
Figure 7B:
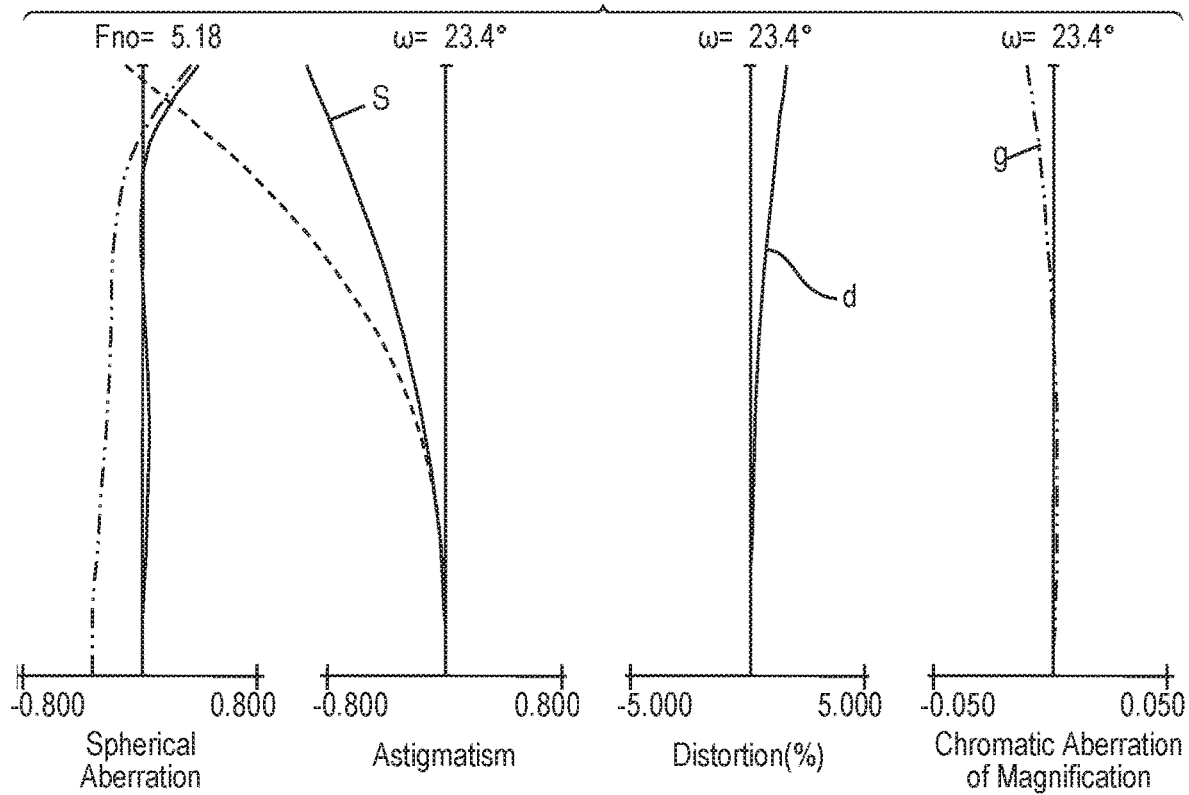
FIG. 7B is an aberration diagram of the zoom lens according to Embodiment 2 when the object distance is close proximity at the telephoto end.

FIG. 5 is a lens cross-sectional view of a zoom lens according to Embodiment 2 of the present invention at a wide-angle end. FIG. 6A and FIG. 6B are longitudinal aberration diagrams of the zoom lens according to Embodiment 2 when an object distance is infinite object distance at the wide-angle end and a telephoto end, respectively. FIG. 7A and FIG. 7B are longitudinal aberration diagrams of the zoom lens according to Embodiment 2 when an object distance is proximity at the wide-angle end and the telephoto end, respectively.

Figure 8A:
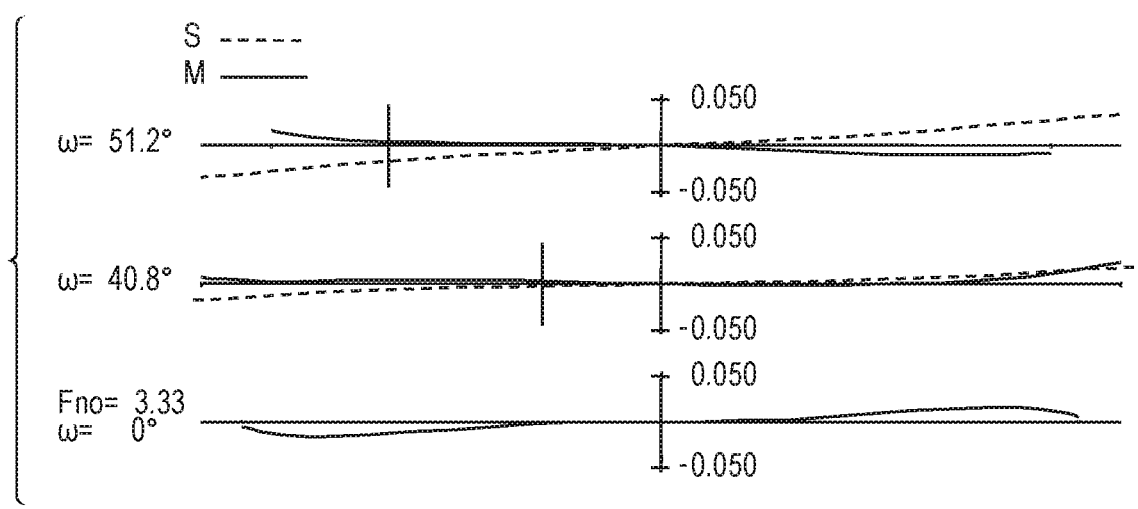
FIG. 8A is a lateral aberration diagram of the zoom lens according to Embodiment 2 when the object distance is infinite object distance with no shift at the wide-angle end.
Figure 8B:
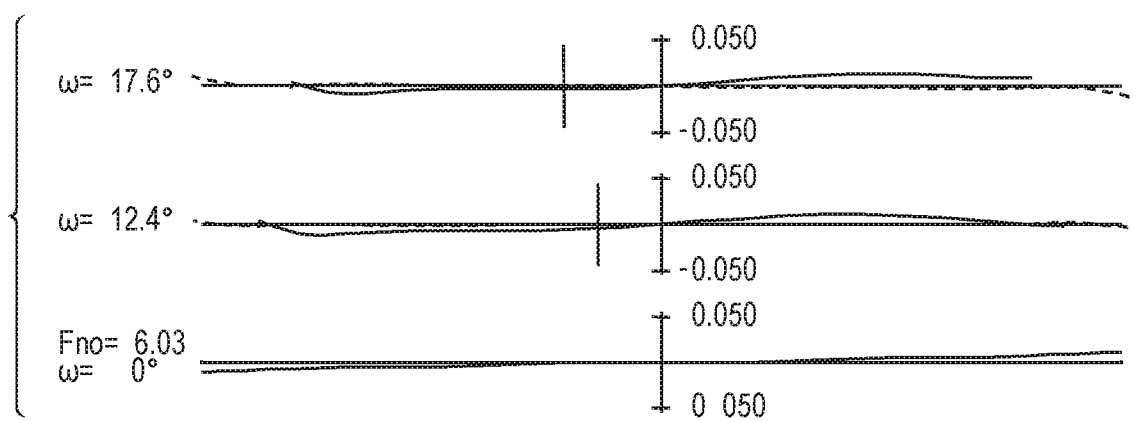
FIG. 8B is a lateral aberration diagram of the zoom lens according to Embodiment 2 when the object distance is infinite object distance with no shift at the telephoto end.
Figure 8C:
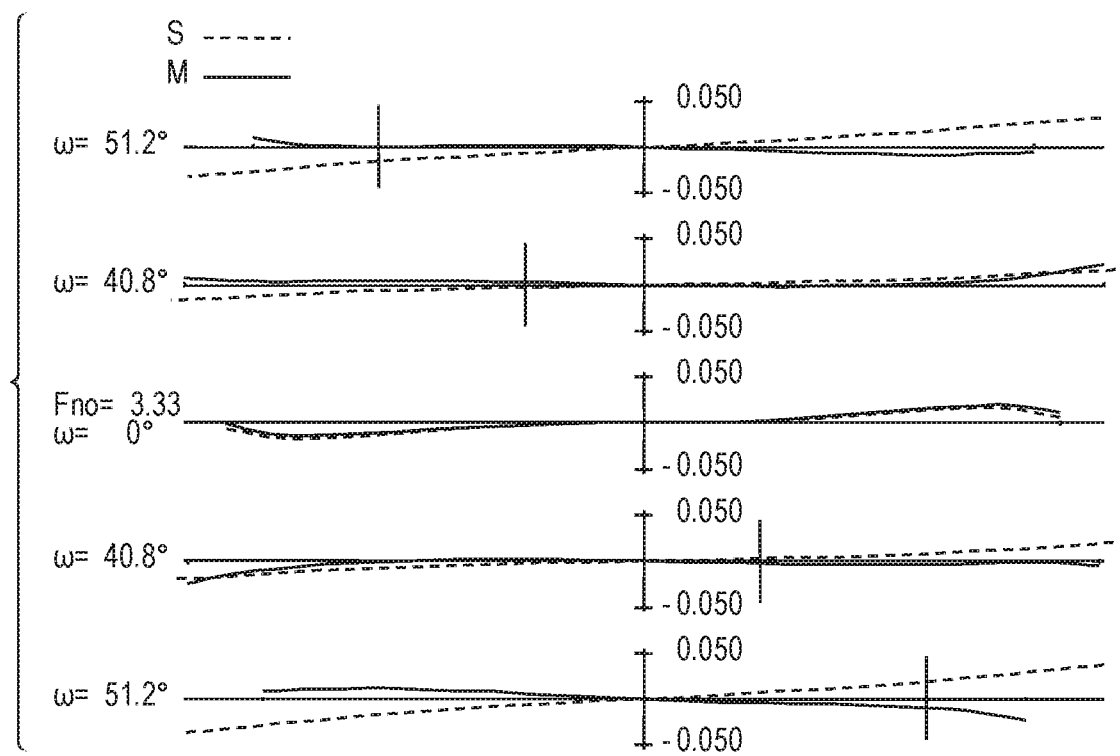
FIG. 8C is a lateral aberration diagram of the zoom lens according to Embodiment 2 when the object distance is infinite object distance with image stabilization of 0.3° at the wide-angle end.
Figure 8D:
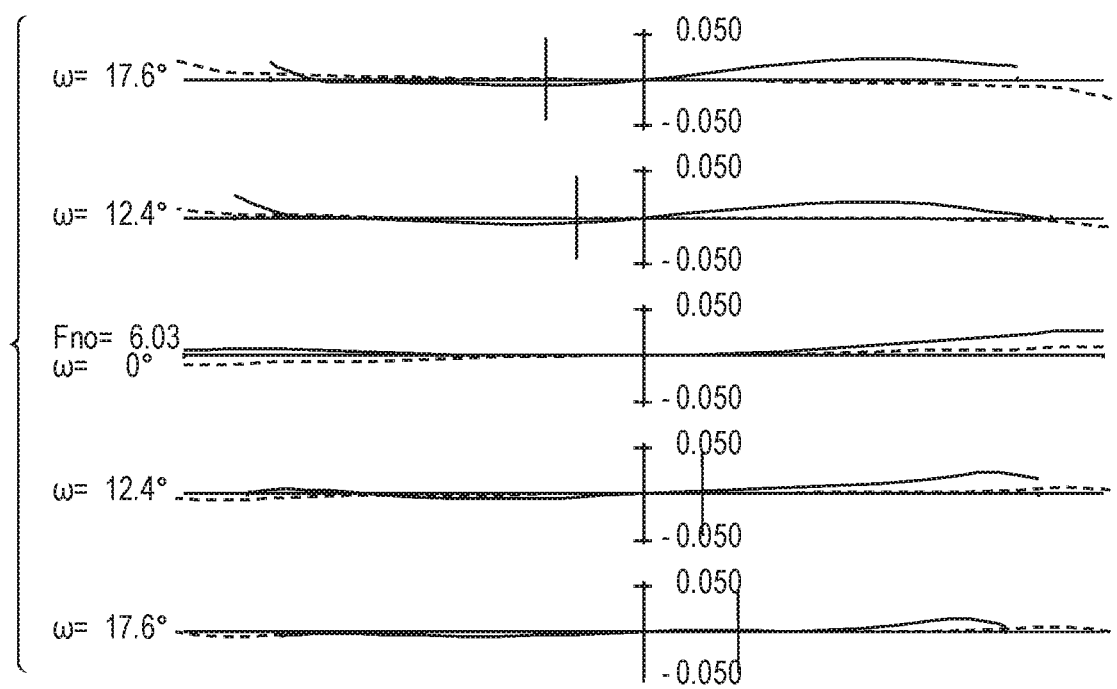
FIG. 8D is a lateral aberration diagram of the zoom lens according to Embodiment 2 when the object distance is infinite object distance with image stabilization of 0.3° at the telephoto end.

FIG. 8A and FIG. 8B are lateral aberration diagrams of the zoom lens according to Embodiment 2 when the object distance is infinite object distance with no shift (normal state) at the wide-angle end and with no shift at the telephoto end, respectively, during image stabilization. FIG. 8C and FIG. 8D are lateral aberration diagrams of the zoom lens according to Embodiment 2 with image stabilization of 0.3° at the wide-angle end and with the image stabilization of 0.3° at the telephoto end, respectively.

Figure 9:
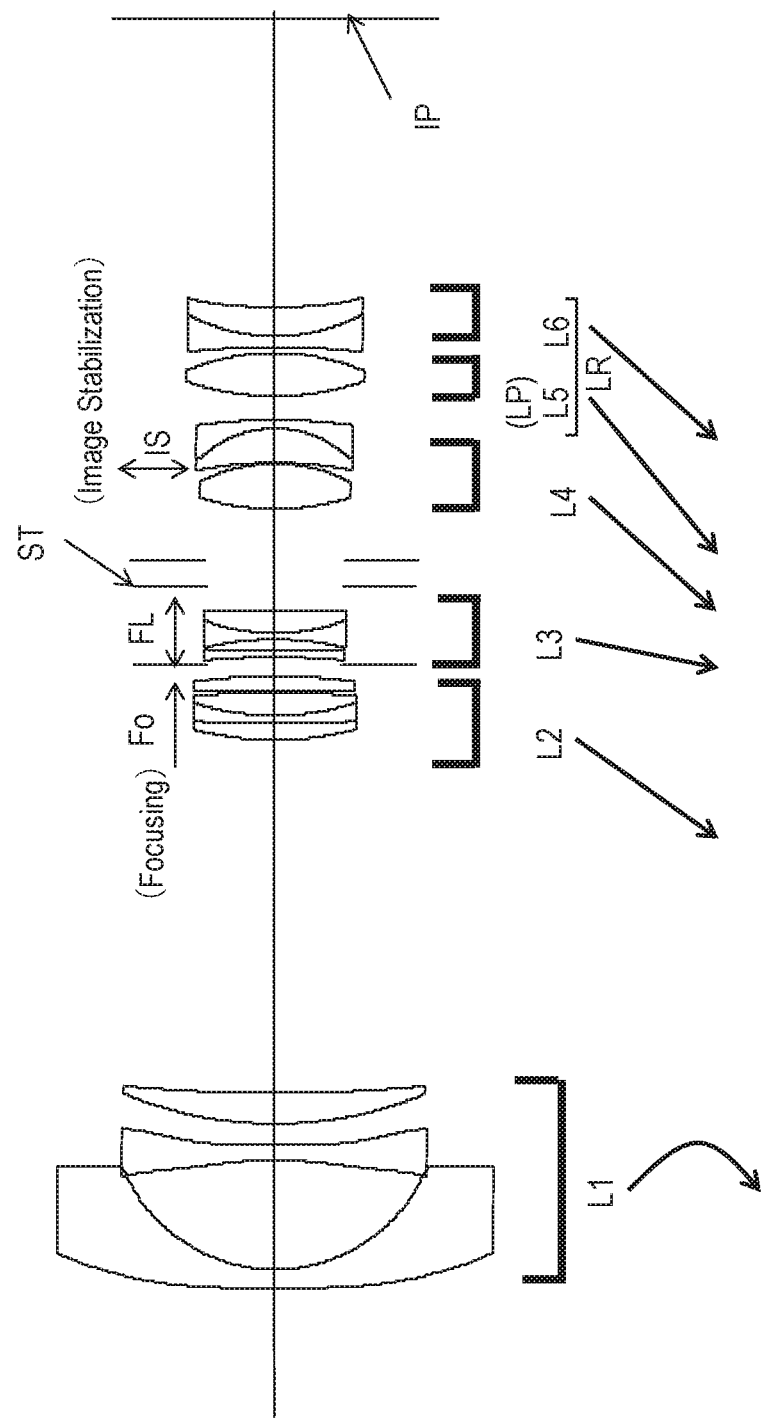
FIG. 9 is a lens cross-sectional view of a zoom lens according to Embodiment 3 of the present invention.
Figure 10A:
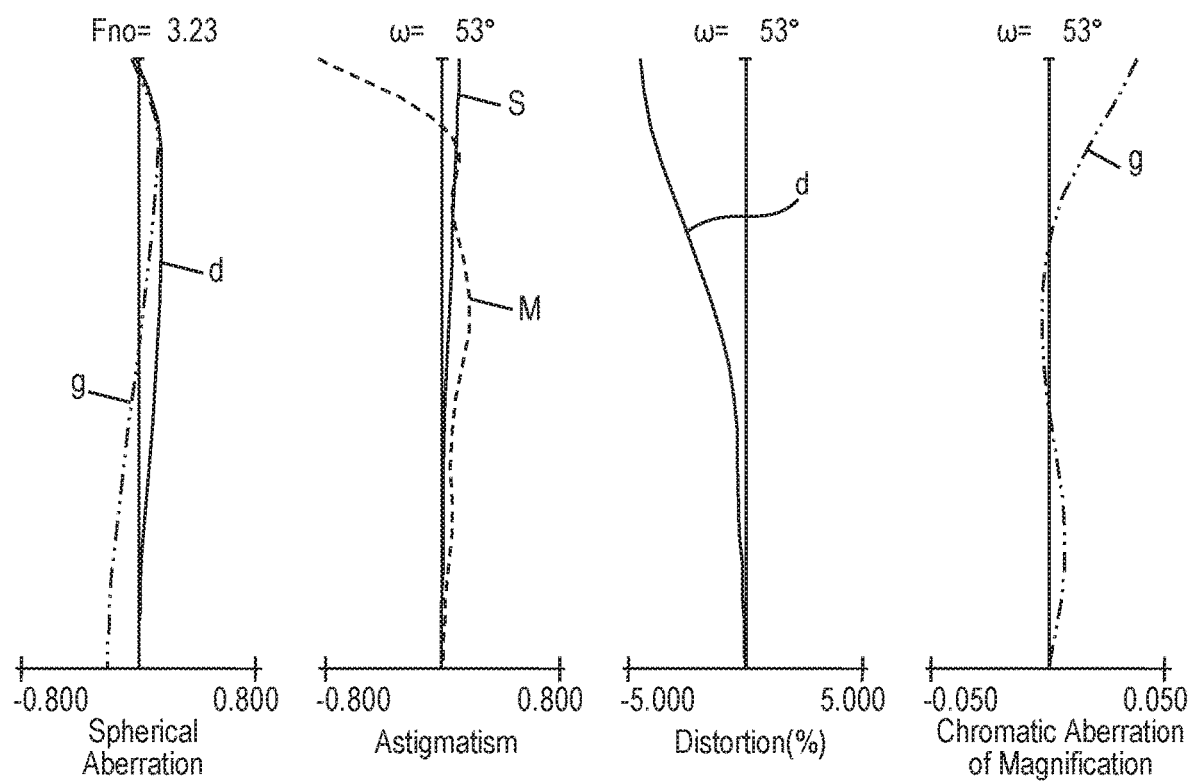
FIG. 10A is an aberration diagram of the zoom lens according to Embodiment 3 when an object distance is infinite object distance at a wide-angle end.
Figure 10B:
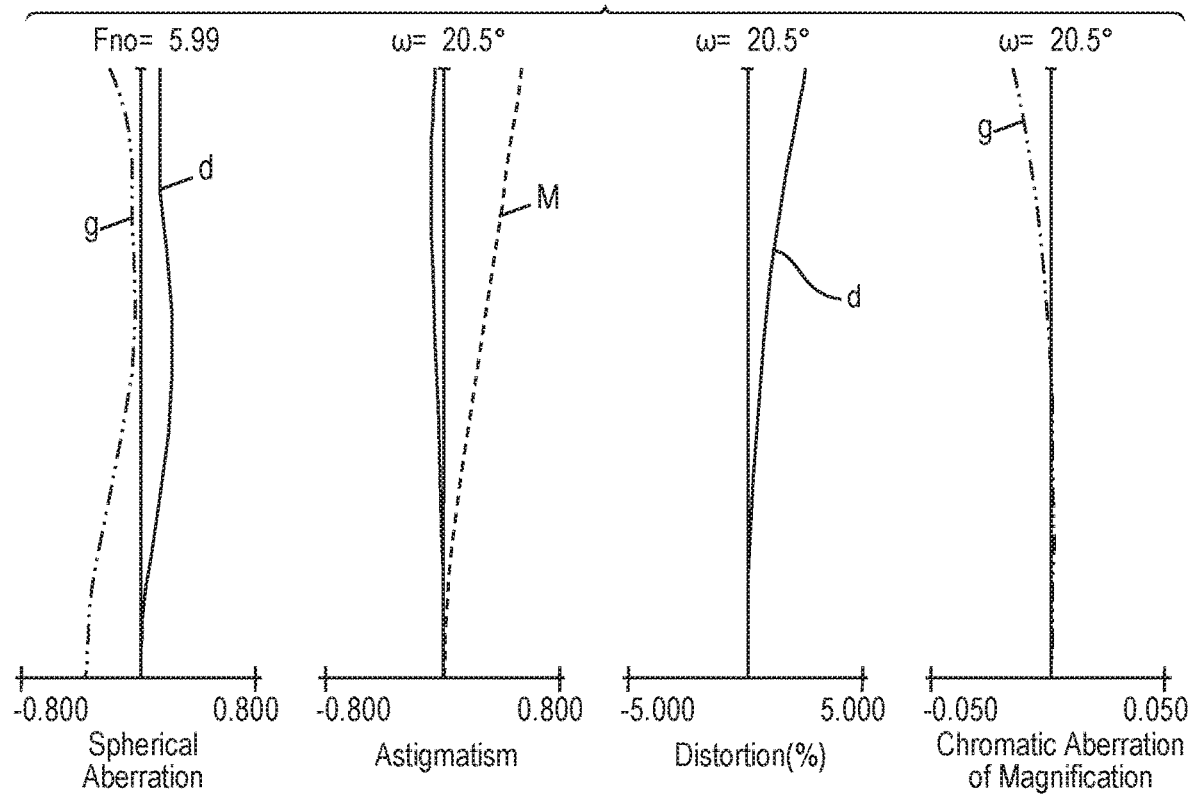
FIG. 10B is an aberration diagram of the zoom lens according to Embodiment 3 when the object distance is infinite object distance at a telephoto end.
Figure 11A:
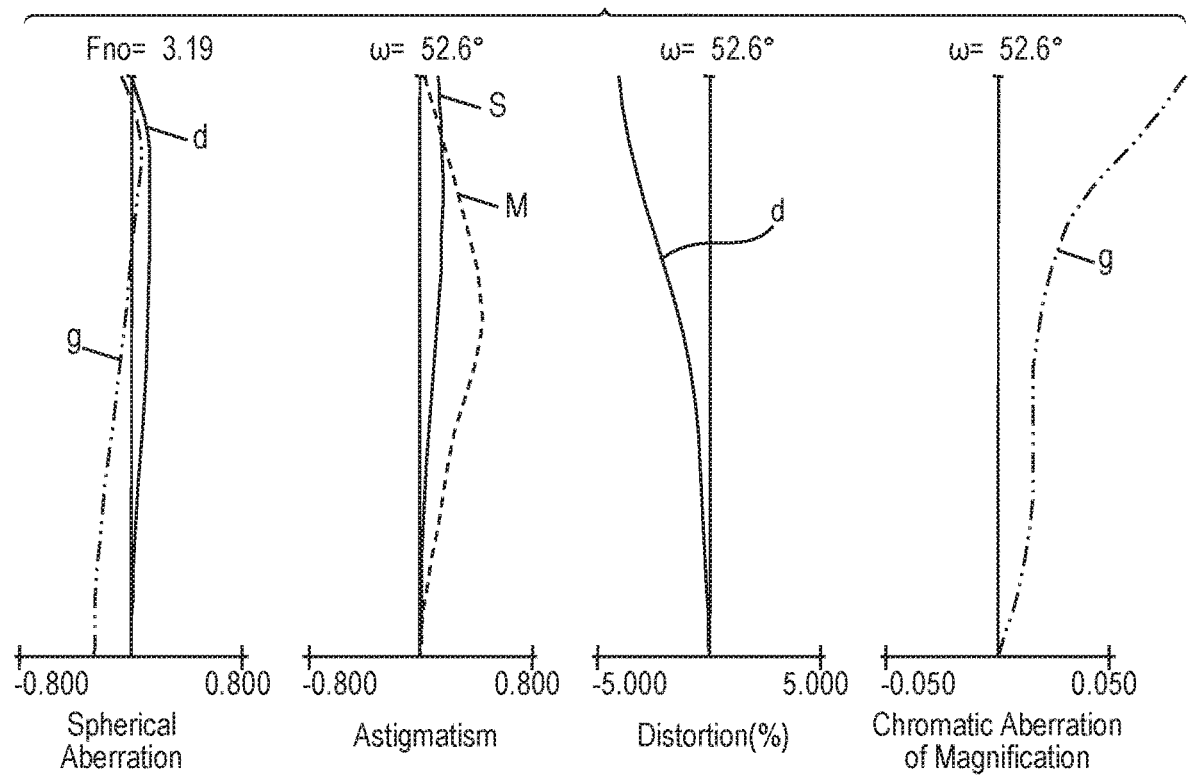
FIG. 11A is an aberration diagram of the zoom lens according to Embodiment 3 when an object distance is close proximity at the wide-angle end.
Figure 11B:
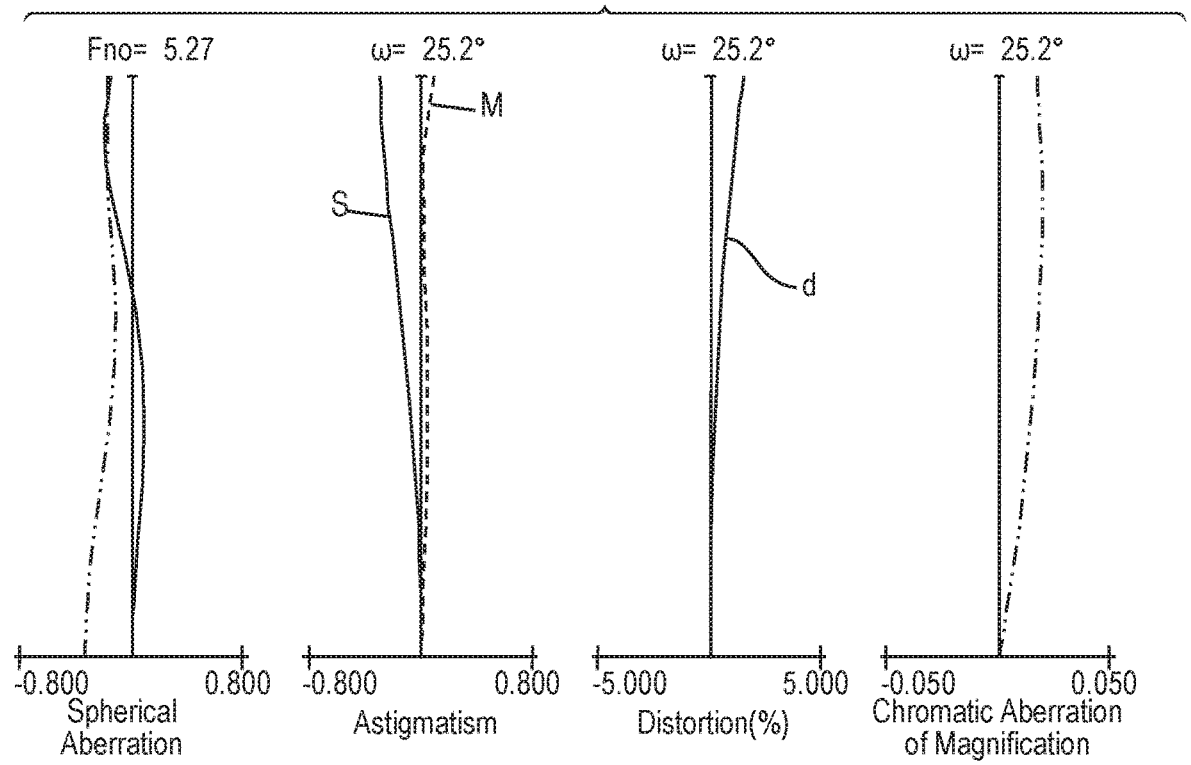
FIG. 11B is an aberration diagram of the zoom lens according to Embodiment 3 when the object distance is close proximity at the telephoto end.

FIG. 9 is a lens cross-sectional view of a zoom lens according to Embodiment 3 of the present invention at a wide-angle end. FIG. 10A and FIG. 10B are longitudinal aberration diagrams of the zoom lens according to Embodiment 3 when an object distance is infinite object distance at the wide-angle end and a telephoto end, respectively. FIG. 11A and FIG. 11B are longitudinal aberration diagrams of the zoom lens according to Embodiment 3 when an object distance is proximity at the wide-angle end and the telephoto end, respectively.

Figure 12A:
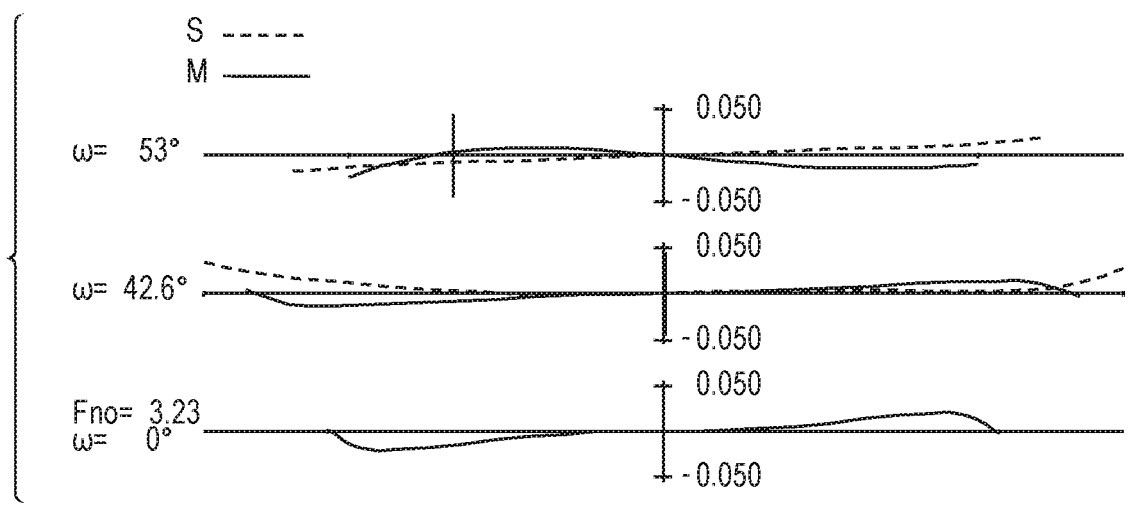
FIG. 12A is a lateral aberration diagram of the zoom lens according to Embodiment 3 when the object distance is infinite object distance with no shift at the wide-angle end.
Figure 12B:
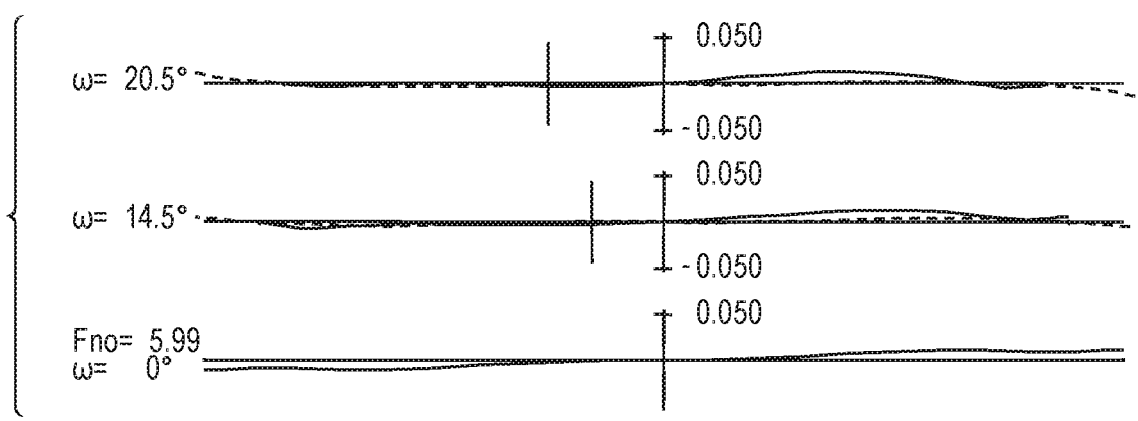
FIG. 12B is a lateral aberration diagram of the zoom lens according to Embodiment 3 when the object distance is infinite object distance with no shift at the telephoto end.
Figure 12C:
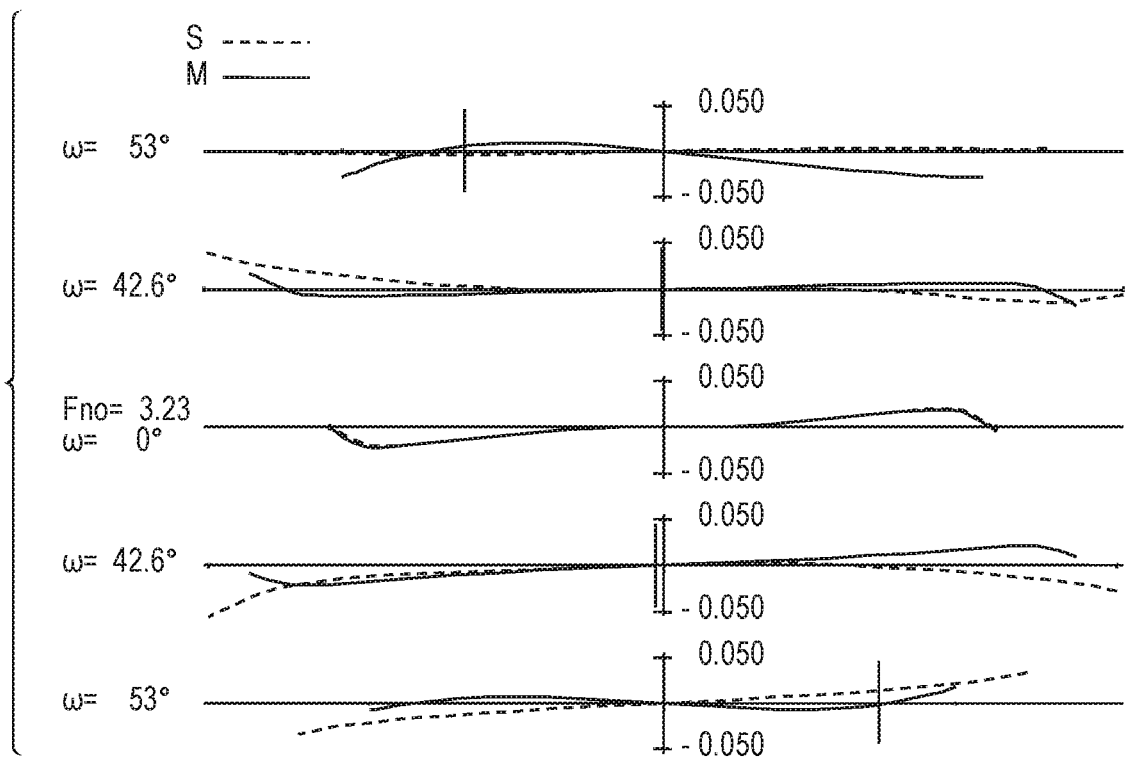
FIG. 12C is a lateral aberration diagram of the zoom lens according to Embodiment 3 when the object distance is infinite object distance with image stabilization of 0.3° at the wide-angle end.
Figure 12D:
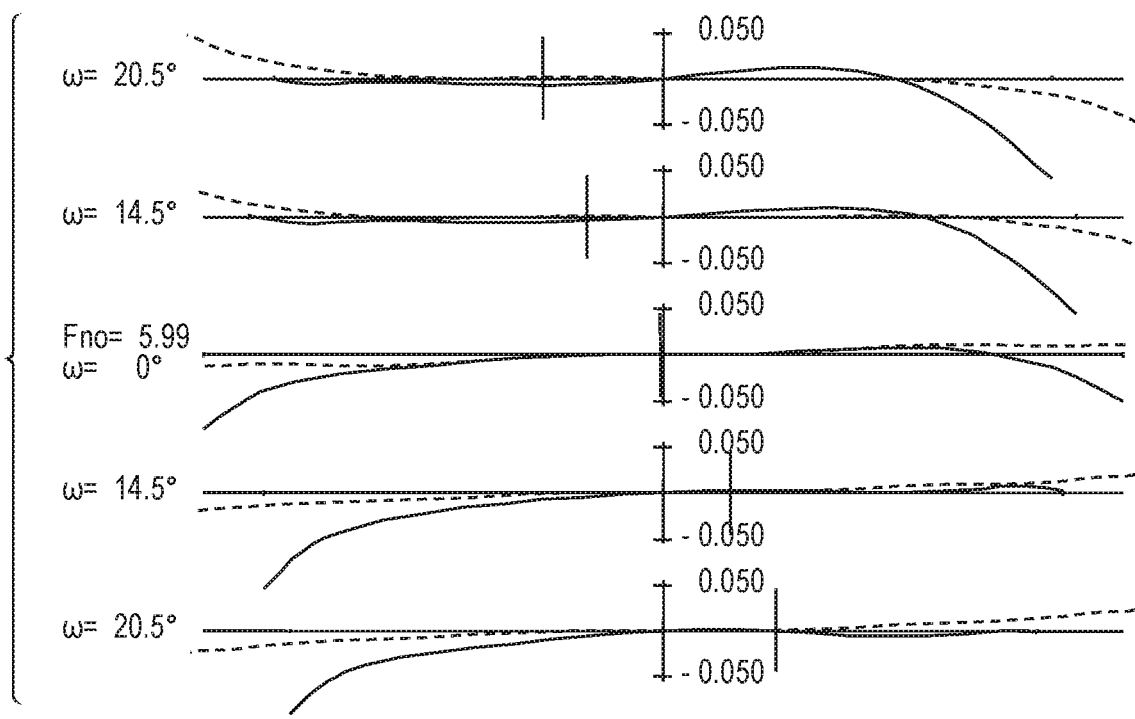
FIG. 12D is a lateral aberration diagram of the zoom lens according to Embodiment 3 when the object distance is infinite object distance with image stabilization of 0.3° at the telephoto end.
Figure 13:
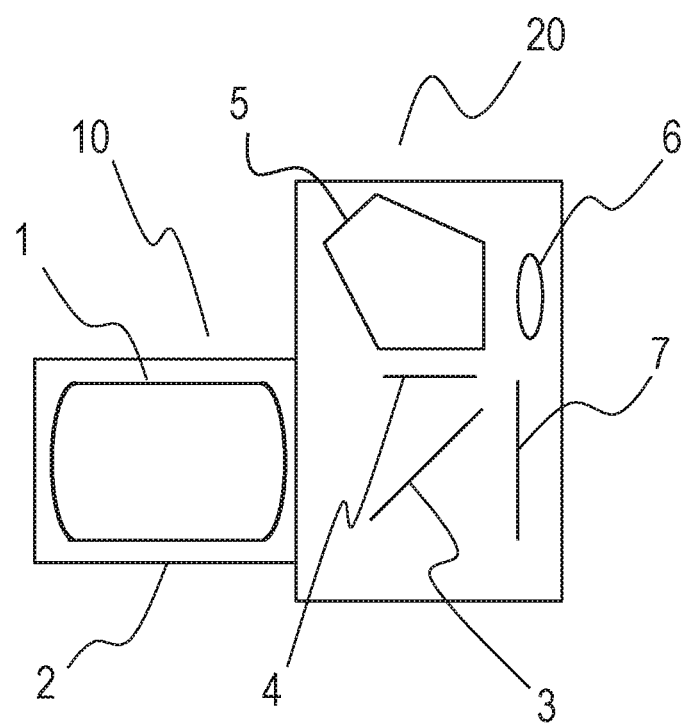
FIG. 13 is an explanatory diagram of a main part of an image pickup apparatus according to an Embodiment.

FIG. 12A and FIG. 12B are lateral aberration diagrams of the zoom lens according to Embodiment 3 when the object distance is infinite object distance with no shift (normal state) at the wide-angle end and with no shift at the telephoto end, respectively, during image stabilization. FIG. 12C and FIG. 12D are lateral aberration diagrams of the zoom lens according to Embodiment 3 with image stabilization of 0.3° at the wide-angle end and with the image stabilization of 0.3° at the telephoto end, respectively. FIG. 13 is a schematic view of a main part of an image pickup apparatus of the present invention.

The zoom lens of each of Embodiments is an image pickup optical system (optical system) that is to be used in an image pickup apparatus, such as a video camera, a digital video camera, or a silver-halide film camera. In the lens cross-sectional view, the left side is the object side (front side), and the right side is the image side (rear side). In the lens cross-sectional views, i represents an order of a lens unit from the object side, and Li represents an i-th lens unit. LR represents a rear lens group including at least one lens unit. ST represents an aperture stop. IS represents a lens system for image stabilization.

An image plane IP corresponds to an image pickup plane of a solid-state image pickup element (photoelectric conversion element), such as a CCD sensor or a CMOS sensor, when the zoom lens of the present invention is used as a photographing optical system of a video camera or a digital still camera, and to a film surface when the zoom lens of the present invention is used for a silver-halide film camera. The arrows indicate loci of movements of the lens units during zooming from the wide-angle end to the telephoto end. The arrows Fo and FL regarding focus indicate a movement direction of a lens unit during focusing from the infinite object distance to close distance. The arrow regarding image stabilization indicates a movement direction of the lens system IS, which is configured to move in a direction including a component in a direction perpendicular to an optical axis during the image stabilization.

The respective longitudinal aberration diagrams are illustrations of a spherical aberration, an astigmatism, a distortion, and a chromatic aberration of magnification in order from the left. In the diagrams for illustrating the spherical aberration, a solid line "d" indicates a d-line (587.6 nm), and a double-dashed line "g" indicates a g-line (435.8 nm). In addition, in the diagrams for illustrating the astigmatism, a solid line S indicates a sagittal direction of the d-line, and a broken line "M" indicates a meridional direction of the d-line. Further, the diagrams for illustrating the distortion indicate a distortion in the d-line. In the diagrams for illustrating the chromatic aberration of magnification, g represents a g-line. Fno represents an f-number, and ω represents a half angle of view. In the lateral aberration diagrams, S represents a sagittal ray, and M represents a meridional ray.

In the following Embodiments, the wide-angle end and the telephoto end are zoom positions when a magnification-varying lens unit is located at each end of a mechanically movable range on the optical axis. The above-mentioned zoom lens described in Japanese Patent Application Laid-Open No. 2008-046208 is a four-unit zoom lens consisting of, in order from an object side to an image side, first to fourth lens units having negative, positive, negative, and positive refractive indices. The zoom lens as a whole adopts a retrofocus type refractive power arrangement, in which the first lens unit having the negative refractive power, and a composite lens unit having a positive refractive power, which is formed of the second and subsequent lens units, are arranged, and adopts a refractive power arrangement that achieves a super wide image pickup angle of view exceeding 100°.

Further, the zoom lens is based on a short zoom configuration, in which an interval between the lens unit having the negative refractive power and the lens unit having the positive refractive power is reduced during zooming from a wide-angle end to a telephoto end. The second and subsequent lens units are divided into lens units having positive, negative, and positive refractive indices, and the lens unit having the negative refractive power in the middle is configured to move toward the image side relatively to the lens units having the positive refractive indices to perform magnification and correct aberrations. In a retrofocus type zoom lens, the first lens unit, which causes relatively small variations in aberrations, is often moved to perform focusing. In recent years, many zoom lenses use an inner focus type to perform driving for focusing silently at high speed.

For example, when the second lens unit is used for focusing, an incident height of an axial ray at the telephoto end and an incident height of an off-axial principal ray at the wide-angle end both become larger. Therefore, it becomes difficult to correct the variations in aberrations caused by focusing.

Under the above-mentioned circumstances, the inventor of the present invention has conceived the following idea: in addition to the second lens unit, the third lens unit having the negative refractive power is configured to move to assist in focusing, to thereby reduce both of a variation in curvature of field at the wide-angle end and a variation in spherical aberration at the telephoto end. Meanwhile, in recent years, a zoom lens having a wide angle of view is desired to have an image stabilization function. In a four-unit zoom lens consisting of first to fourth lens units having negative, positive, negative, and positive refractive indices, as in US Patent Application Publication No. 2012/0069441, it is effective to perform the image stabilization with the third lens unit having the negative refractive power, which has a small effective diameter.

The reasons are that the incident height of the off-axial ray is low because of the proximity to the aperture stop, and that the incident height of the axial ray is also low because the ray is converged by the second lens unit having the positive refractive power. In other words, the third lens unit L3 is suitable both as a lens unit for assisting in focusing, and as a lens unit for image stabilization. However, when the zoom lens having the wide angle of view is to be configured to cause the small variations in aberrations with the change in object distance and have the image stabilization function, it becomes difficult to form those configurations with simple and small configurations in view of mechanical structure.

Under the above-mentioned circumstances, in the present invention, first, the third lens unit having the negative refractive power is used to assist in focusing. Next, the fourth lens unit having the positive refractive power is divided into a plurality of lens units, that is, the following two lens units in order from an object side: a lens unit (fourth lens unit) having a positive refractive power at a position at which the incident height of the axial ray is high, and a rear lens group including a lens unit having a weak refractive power on an image side of the fourth lens unit having the positive refractive power.

The fourth lens unit having the positive refractive power is located at a position close to the aperture stop, at which the incident height of the off-axial ray is small and the incident height of the axial ray is large, and hence is suited to correcting aberrations of the axial ray. Moreover, with the axial ray that has become afocal in the third lens unit L3 having the negative refractive power entering the fourth lens unit, the fourth lens unit has an effective diameter that is substantially equal to that of the third lens unit L3. The rear lens group is suited to correcting aberrations of the off-axial ray because the incident height of the axial ray is reduced with the positive refractive power of the fourth lens unit, and the incident height of the off-axial ray is increased at the position away from the aperture stop.

When such refractive power arrangement is adopted, the fourth lens unit having the positive refractive power, which has the small effective diameter, is used as the lens system IS for image stabilization, and the fourth lens unit is used to reduce the variations in aberrations caused by the object distance, and to perform the image stabilization.

For the above-mentioned reasons, the zoom lens according to each of Embodiments includes, in order from an object side to an image side, a first lens unit L1 having a negative refractive power, a second lens unit L2 having a positive refractive power, a third lens unit L3 having a negative refractive power, a fourth lens unit L4 having a positive refractive power, and a rear lens group LR including at least one lens unit.

An interval between each pair of adjacent lens units is changed during zooming. At least the third lens unit L3 is configured to move during focusing. At least a part of the fourth lens unit L4 forms the lens system IS, which is configured to move so as to include a component in a direction perpendicular to the optical axis during the image stabilization. In other words, the lens system IS is configured to perform image stabilization. As a result, there is obtained the zoom lens, which causes small variations in aberrations with a variation in object distance, and is capable of performing the image stabilization satisfactorily.

Next, a more preferred configuration of the zoom lens according to each of Embodiments is described. It is preferred that, in addition to the third lens unit L3, at least a part of the second lens unit L2 be configured to move during focusing. The second lens unit L2 has high focusing sensitivity with the incident height of the axial ray being high at the telephoto end. On the other hand, the incident height of the off-axial ray is also high at the wide-angle end, and it becomes difficult to suppress the variations in aberrations during focusing. When the variations in aberrations at this time are corrected by the movement for focusing of the third lens unit L3, the focusing and the correction of the variations in aberrations at that time can be performed most efficiently.

On the wide-angle end side, it is preferred that the second lens unit L2 and the third lens unit L3 be configured to move toward the image side during focusing from infinite object distance to a closest object distance. This configuration is preferred because the curvature of field caused by the movement of the second lens unit L2 can be effectively corrected. Moreover, on the telephoto end side, it is preferred that the second lens unit L2 be configured to move toward the image side, and that the third lens unit L3 be configured to move toward the object side during focusing from infinite object distance to the closest object distance. This configuration is preferred because the variation in spherical aberration caused by the movement of the second lens unit L2 can be effectively corrected.

In each of Embodiments, it is preferred that the fourth lens unit L4 include two positive lenses and one negative lens. It is preferred that the rear lens group LR include a lens unit having a positive refractive power, and that a lens unit LP closest to the object side of the lens unit having the positive refractive power included in the rear lens group LR include two positive lenses and one negative lens. In Embodiment 1, the rear lens group LR consists of a fifth lens unit having a positive refractive power. In Embodiment 2, the rear lens group LR consists of, in order from the object side to the image side, a fifth lens unit L5 having a negative refractive power, and a sixth lens unit L6 having a positive refractive power.

In Embodiment 3, the rear lens group LR consists of, in order from the object side to the image side, a fifth lens unit L5 having a positive refractive power, and a sixth lens unit L6 having a negative refractive power. In each of Embodiments, it is preferred to satisfy one or more of the conditional expressions provided below. A focal length of the rear lens group LR at the wide-angle end is represented by fRw, and a focal length of an entire system of the zoom lens at the wide-angle end is represented by fw. A focal length of the lens system IS for image stabilization is represented by f4S. A focal length of the first lens unit L1 is represented by f1, a focal length of the second lens unit L2 is represented by f2, and a focal length of the third lens unit L3 is represented by f3.

At this time, it is preferred to satisfy one or more of the following conditional expressions:

$$-0.1 < fw/fRw < 0.3 \quad (1);$$

$$2.0 < f4S/fw < 6.0 \quad (2);$$

$$1.0 < -f1/fw < 2.0 \quad (3);$$

$$1.0 < f2/fw < 3.0 \quad (4); \text{ and}$$

$$1.0 < -f3/fw < 4.0 \quad (5).$$

Next, technical meanings of the conditional expressions provided above are described. The conditional expression (1) relates to the refractive power of the rear lens group LR. The conditional expression (1) is intended to appropriately set a share of the positive refractive power with the fourth lens unit L4, to thereby effectively obtain image stabilization sensitivity while downsizing the fourth lens unit L4. When the ratio exceeds the upper limit value of the conditional expression (1), the positive refractive power of the fourth lens unit L4 becomes weaker to reduce the image stabilization sensitivity, and it becomes difficult to effectively perform the image stabilization. When the ratio falls below the lower limit value of the conditional expression (1), the incident height of the off-axial ray on the fourth lens unit L4 becomes higher, with the result that the effective diameter is increased, and that the image stabilization mechanism is disadvantageously increased in size.

It is more preferred to set the numerical range of the conditional expression (1) as follows:

$$0.0 < fw/fRw < 0.2 \quad (1a).$$

In other words, when the refractive power of the rear lens group LR is positive, retrofocus refractive power arrangement is strengthened, and it becomes advantageously easy to achieve the wide angle of view at the wide-angle end.

The conditional expression (2) is intended to appropriately set the refractive power of the lens system IS for image stabilization, to thereby effectively obtain the image stabilization sensitivity. When the ratio exceeds the upper limit value of the conditional expression (2), the image stabilization sensitivity becomes much lower, and a shift amount (movement amount) of the lens system IS during the image stabilization is disadvantageously increased. When the ratio falls below the lower limit value of the conditional expression (2), the refractive power of the lens system IS for image stabilization becomes much stronger, and it becomes disadvantageously difficult to control the image stabilization.

It is more preferred to set the numerical range of the conditional expression (2) as follows:

$$2.5 < f4S/fw < 5.5 \quad (2a).$$

The conditional expressions (3), (4), and (5) are intended to optimize the refractive indices of the first lens unit L1, the second lens unit L2, and the third lens unit L3, respectively, to thereby downsize the entire system while suppressing variations in various aberrations.

When the ratio exceeds the upper limit value of the conditional expression (3), the negative refractive power of the first lens unit L1 is too weak (absolute value of the negative refractive power is too small), and it becomes difficult to achieve a wide angle of view at the wide-angle end. When the ratio falls below the lower limit value of the conditional expression (3), the negative refractive power of the first lens unit L1 is too strong (absolute value of the negative refractive power is too large), and sagittal curvature of field and distortion are increased at the wide-angle end, with the result that it becomes difficult to correct those various aberrations.

When the ratio exceeds the upper limit value of the conditional expression (4), the positive refractive power of the second lens unit L2 is too weak, and it becomes difficult to obtain a sufficient zoom ratio. When the ratio falls below the lower limit value of the conditional expression (4), the positive refractive power of the second lens unit L2 is too strong, and it becomes difficult to correct astigmatism at the telephoto end.

When the ratio exceeds the upper limit value of the conditional expression (5), the negative refractive power of the third lens unit L3 is too weak, and it becomes difficult to secure the sufficient magnification ratio with a change in interval between the second lens unit L2 and the third lens unit L3. When the ratio falls below the lower limit value of the conditional expression (5), the negative refractive power of the third lens unit L3 is too strong, and spherical aberration is disadvantageously overcorrected at the telephoto end.

It is preferred to set the numerical ranges of the conditional expressions (3) to (5) as follows:

$$1.2 < -f1/fw < 1.8 \quad (3a);$$

$$1.3 < f2/fw < 2.5 \quad (4a); \text{ and}$$

$$1.3 < -f3/fw < 3.5 \quad (5a).$$

Next, a preferred configuration in each of Embodiments is described. The rear lens group LR includes a lens unit having a positive refractive power, and a lens unit arranged closest to the object side of the lens unit having the positive refractive power included in the rear lens group LR is defined as a lens unit LP. It is preferred that an interval between the fourth lens unit and the lens unit LP be reduced during zooming from the wide-angle end to the telephoto end. With this configuration, the interval between the fourth lens unit L4 and the lens unit LP is increased at the wide-angle end, with the result that the incident height of the off-axial principal ray on the fourth lens unit L4 can be reduced, and that it becomes easy to reduce an effective diameter of the lens system IS for image stabilization.

It is preferred that the fourth lens unit L4 include two positive lenses and one negative lens. It is preferred that the fourth lens unit L4 include not a single lens but lenses of different signs to correct the aberrations during the image stabilization, and that the fourth lens unit L4 include the number of positive lenses that is larger than the number of negative lenses to effectively obtain the positive refractive power. It is particularly preferred that the fourth lens unit L4 include the following three lenses: two positive lenses and one negative lens to downsize the entire system.

It is preferred that the lens unit LP include two positive lenses and one negative lens. It is preferred that the lens unit LP include not a single lens but lenses of different signs to satisfactorily correct off-axial aberrations, and that the lens unit LP include the number of positive lenses that is larger than the number of negative lenses to effectively obtain the positive refractive power. It is preferred that an interval between the first lens unit L1 and the second lens unit L2 be reduced, an interval between the second lens unit L2 and the third lens unit L3 be increased, and an interval between the third lens unit L3 and the fourth lens unit L4 be reduced during zooming from the wide-angle end to the telephoto end.

To the zoom lens according to each of Embodiments, there can be applied a five-unit zoom lens consisting of, in order from an object side, a first lens unit L1 having a negative refractive power, a second lens unit L2 having a positive refractive power, a third lens unit L3 having a negative refractive power, a fourth lens unit L4 having a positive refractive power, and a fifth lens unit L5 having a positive refractive power, for example. Alternatively, there can be applied a six-unit zoom lens consisting of, in order from an object side, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power, or a six-unit zoom lens consisting of, in order from an object side, a first lens unit L1 having a negative refractive power, a second lens unit L2 having a positive refractive power, a third lens unit L3 having a negative refractive power, a fourth lens unit L4 having a positive refractive power, a fifth lens unit L5 having a positive refractive power, and a sixth lens unit L6 having a negative refractive power.

The term "lens unit" as used herein means optical elements from the frontmost surface of the optical system or a surface having an interval from a lens that is adjacent in the front direction changed with zooming to the rearmost surface of the optical system or a surface having an interval from a lens that is adjacent in the rear direction changed with zooming.

Now, a configuration in each of Embodiments is described. Embodiment 1 relates to a five-unit zoom lens consisting of, in order from an object side to an image side, a first lens unit L1 having a negative refractive power, a second lens unit L2 having a positive refractive power, a third lens unit L3 having a negative refractive power, a fourth lens unit L4 having a positive refractive power, and a fifth lens unit L5 (lens unit LP) having a positive refractive power, the zoom lens having an image pickup angle of view at the wide-angle end of 102.38°, and a zoom ratio of 3.91.

The second lens unit L2 is configured to move toward the image side over the entire zoom region during focusing to effectively obtain the focusing sensitivity. Moreover, the third lens unit L3 is configured to move toward the image side near the wide-angle end, and toward the object side near the telephoto end during focusing. As a result, the variation in curvature of field is corrected on the wide-angle side, and the variation in spherical aberration is corrected on the telephoto side.

The lens system IS for image stabilization consists of the fourth lens unit L4. The fourth lens unit L4 and the fifth lens unit L5 satisfy the conditional expressions (1) and (2) to effectively correct the aberrations of the axial ray with the fourth lens unit L4 and correct the aberrations of the off-axial ray with the fifth lens unit L5 while suppressing the increase in effective diameter of the fourth lens unit L4.

The fourth lens unit L4 and the fifth lens unit L5 are configured to move so as to reduce the interval therebetween during zooming from the wide-angle end to the telephoto end, to thereby increase a difference in incident height of the off-axial ray on the fourth lens unit L4 and the fifth lens unit L5 at the wide-angle end, and easily reduce the diameters. Moreover, the interval between the first lens unit L1 and the second lens unit L2 is reduced, the interval between the second lens unit L2 and the third lens unit L3 is increased, and the interval between the third lens unit L3 and the fourth lens unit L4 is reduced during zooming from the wide-angle end to the telephoto end, to thereby effectively perform magnification.

Moreover, each of the fourth lens unit L4 and the fifth lens unit L5 consists of two positive lenses and one negative lens, with the result that decentering aberration is reduced with the fourth lens unit L4, and that the off-axial aberrations are effectively suppressed with the fifth lens unit L5 while maintaining small sizes of both of the fourth lens unit L4 and the fifth lens unit L5. Moreover, the first lens unit L1, the second lens unit L2, and the third lens unit L3 satisfy the conditional expressions (3), (4), and (5), respectively, to thereby obtain high optical performance while downsizing the entire system.

Embodiment 2 relates to a six-unit zoom lens consisting of, in order from an object side to an image side, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 (lens unit LP) having a positive refractive power, the zoom lens having an image pickup angle of view at the wide-angle end of 102.38°, and a zoom ratio of 3.91.

The fourth lens unit L4 and the sixth lens unit L6 are configured to move so as to reduce the interval therebetween during zooming from the wide-angle end to the telephoto end, to thereby increase a difference in incident height of the off-axial ray on the fourth lens unit L4 and the sixth lens unit L6 at the wide-angle end, and easily reduce the diameters of the entire system. Configurations and optical actions of the respective lens units in Embodiment 2 are similar to those in Embodiment 1.

Embodiment 3 relates to a six-unit zoom lens consisting of, in order from an object side to an image side, a first lens unit L1 having a negative refractive power, a second lens unit L2 having a positive refractive power, a third lens unit L3 having a negative refractive power, a fourth lens unit L4 having a positive refractive power, a fifth lens unit L5 (lens unit LP) having a positive refractive power, and a sixth lens unit L6 having a negative refractive power, the zoom lens having an image pickup angle of view at the wide-angle end of 106.02°, and a zoom ratio of 3.56. Configurations and optical actions of the respective lens units in Embodiment 3 are similar to those in Embodiment 1.

Next, an Embodiment in which the zoom lens described in each of Embodiments 1 to 3 is applied to an image pickup apparatus is described with reference to FIG. 13. FIG. 13 is a schematic diagram of a main part of a single-lens reflex camera. In FIG. 13, an image pickup optical system 10 includes a zoom lens 1 of Embodiments 1 to 3. The zoom lens 1 is held by a lens barrel 2 serving as a holding member. A camera main body 20 includes a quick return mirror 3 for reflecting a light flux from the image pickup optical system 10 to the upward direction, and a reticle plate 4 arranged in an image forming apparatus for the image pickup optical system 10.

The camera main body 20 further includes a roof pentaprism 5 for converting an inverse image formed on the reticle plate 4 into an erect image, and an eyepiece lens 6 for observing the erect image. As a photosensitive plane 7, there is arranged a solid-state image pickup element (photoelectric conversion element) such as a CCD sensor or a CMOS sensor for receiving the image formed by the zoom lens, or a silver-halide film. When taking an image, the quick return mirror 3 is retracted from an optical path, and an image is formed on the photosensitive plane 7 by the image pickup optical system 10.

Benefits described in Embodiments 1 to 3 are effectively enjoyed by the image pickup apparatus disclosed in this Embodiment. The present invention can be also applied to a mirrorless single-lens reflex camera without the quick return mirror 3 as the image pickup apparatus.

Although the exemplary Embodiment of the image pickup optical system has been described so far, it goes without saying that the present invention is by no means limited to those Embodiments, and hence various changes and modifications can be made within the scope of the subject matter of the present invention.

Numerical Data 1 to 3 corresponding to Embodiments 1 to 3 are described below. In each Numerical Data, i represents the order of a surface from the object side. In Numerical Data, r represents a curvature radius of the i-th lens surface in order from the object side, d represents the i-th lens thickness and air interval in order from the object side, and nd and vd represent a refractive power and an Abbe number of a material of the i-th lens in order from the object side, respectively. BF represents a back focus. An entire length of the zoom lens is a distance obtained by adding a value of the back focus to a distance from the first lens surface to the last lens surface.

An aspherical shape is expressed by the following equation:

$$X = \frac{H^2/r}{1 + (1 - (H/r)^2)^{1/2}} + A4 \cdot H^4 + A6 \cdot H^6 + A8 \cdot H^8 + A10 \cdot H^{10} + A12 \cdot H^{12}$$

where the X axis corresponds to the optical axis direction, the H axis corresponds to the direction perpendicular to the optical axis, the light propagation direction is positive, r represents a paraxial curvature radius, k represents a conic constant, and A4, A6, A8, A10, and A12 represent an aspherical coefficient.

In each aspherical coefficient, "e±xx" means "×10$^{\pm xx}$". Each aspherical surface is indicated by attaching the asterisk (*) to the right of the surface number in Surface data.

In each Numerical Data, r13 and r20 are dummy surfaces used in design. Moreover, relationships between the conditional expressions described above and Numerical Data are shown in Table 1.

(Numerical Data 1)

| Unit mm | | | | |
|---|---|---|---|---|
| Surface data | | | | |
| Surface number | r | d | nd | vd | Effective diameter |
|---|---|---|---|---|---|
| 1* | 1,082.538 | 2.50 | 1.88300 | 40.8 | 57.50 |
| 2 | 22.895 | 14.52 | | | 40.83 |
| 3* | −48.107 | 2.00 | 1.58313 | 59.4 | 40.78 |
| 4* | 319.118 | 0.52 | | | 40.08 |
| 5 | 45.216 | 4.05 | 1.85478 | 24.8 | 40.30 |
| 6 | 100.401 | (Variable) | | | 39.79 |
| 7* | 41.193 | 2.40 | 1.76385 | 48.5 | 24.70 |
| 8 | 142.453 | 1.10 | 1.85478 | 24.8 | 24.18 |
| 9 | 31.969 | 3.43 | 1.60311 | 60.6 | 23.05 |
| 10 | −384.344 | 0.15 | | | 22.69 |
| 11 | 44.048 | 3.25 | 1.76385 | 48.5 | 22.59 |
| 12 | −82.325 | (Variable) | | | 22.50 |

-continued

Unit mm

| | | | | | |
|---|---|---|---|---|---|
| 13 | ∞ | 1.00 | | | 18.62 |
| 14 | 241.786 | 0.80 | 1.77250 | 49.6 | 17.48 |
| 15 | 29.322 | 2.51 | | | 16.47 |
| 16 | −35.973 | 0.80 | 1.69680 | 55.5 | 16.26 |
| 17 | 28.446 | 2.88 | 1.84666 | 23.8 | 16.58 |
| 18 | −240.753 | (Variable) | | | 16.78 |
| 19 (Stop) | ∞ | (Variable) | | | 17.11 |
| 20 | ∞ | (Variable) | | | 17.56 |
| 21 | 32.886 | 5.14 | 1.43875 | 94.9 | 18.04 |
| 22 | −21.947 | 0.15 | | | 18.06 |
| 23 | −44.992 | 4.14 | 1.56732 | 42.8 | 17.71 |
| 24 | −14.266 | 1.10 | 1.85026 | 32.3 | 17.89 |
| 25 | −64.960 | (Variable) | | | 19.05 |
| 26 | 38.105 | 5.59 | 1.49700 | 81.5 | 22.57 |
| 27 | −32.233 | 0.15 | | | 22.82 |
| 28 | −92.171 | 1.40 | 1.91082 | 35.3 | 22.55 |
| 29 | 26.230 | 4.09 | 1.78472 | 25.7 | 22.68 |
| 30* | 110.219 | | | | 22.91 |

Aspherical surface data

First surface

K = 0.00000e+000   A4 = 1.72478e−005   A6 = −3.45899e−008
A8 = 4.50788e−011  A10 = −3.27350e−014  A12 = 1.02158e−017

Third surface

K = 0.00000e+000    A4 = 2.19296e−005   A6 = 2.34566e−008
A8 = −1.51995e−010  A10 = 1.41757e−013

Fourth surface

K = 0.00000e+000    A4 = 3.10095e−005   A6 = 3.98058e−009
A8 = −2.25553e−010  A10 = 3.11124e−013   A12 = −7.83414e−017

Seventh surface

K = 0.00000e+000    A4 = −6.02960e−006  A6 = 6.86222e−009
A8 = −7.64620e−011  A10 = 1.87577e−013

Thirtieth surface

K = 0.00000e+000    A4 = 1.52401e−005   A6 = 1.16486e−008
A8 = −4.85550e−011  A10 = 3.85095e−013

Various data
Zoom ratio 3.91

| | Wide angle | Intermediate | Telephoto |
|---|---|---|---|
| Focal length | 17.40 | 35.00 | 67.98 |
| F-number | 3.23 | 4.10 | 5.85 |
| Half angle of view (degrees) | 51.19 | 31.73 | 17.65 |
| Image height | 21.64 | 21.64 | 21.64 |
| Entire length of zoom lens | 168.46 | 152.31 | 168.39 |
| BF | 38.38 | 53.37 | 84.83 |
| d6 | 38.98 | 11.93 | 1.23 |
| d12 | 1.50 | 8.17 | 14.71 |
| d18 | 12.54 | 10.50 | 1.35 |
| d19 | 1.00 | 1.15 | 1.80 |
| d20 | 7.00 | 0.00 | 0.00 |
| d25 | 5.39 | 3.52 | 0.80 |

Zoom lens unit data

| Unit | First surface | Focal length | Lens unit structure length | Front principal point position | Rear principal point position |
|---|---|---|---|---|---|
| 1 | 1 | −23.36 | 23.59 | 2.50 | −16.60 |
| 2 | 7 | 26.68 | 10.33 | 3.24 | −3.13 |
| 3 | 13 | −29.49 | 7.99 | 1.98 | −4.02 |
| 4 | 21 | 69.51 | 10.53 | −0.64 | −7.51 |
| 5 | 26 | 134.38 | 11.23 | −6.97 | −13.18 |

(Numerical Data 2)

Unit mm

Surface data

| Surface number | r | d | nd | νd | Effective diameter |
|---|---|---|---|---|---|
| 1* | 15,601.425 | 2.50 | 1.88300 | 40.8 | 57.84 |
| 2 | 22.927 | 14.52 | | | 40.85 |
| 3* | −49.062 | 2.00 | 1.58313 | 59.4 | 40.78 |
| 4* | 359.739 | 0.21 | | | 40.22 |
| 5 | 45.800 | 4.07 | 1.85478 | 24.8 | 40.45 |
| 6 | 104.042 | (Variable) | | | 39.95 |
| 7* | 43.399 | 2.34 | 1.76385 | 48.5 | 24.63 |
| 8 | 119.609 | 1.10 | 1.85478 | 24.8 | 24.06 |
| 9 | 31.702 | 3.66 | 1.60311 | 60.6 | 22.95 |
| 10 | −301.786 | 0.15 | | | 22.73 |
| 11 | 41.661 | 3.60 | 1.76385 | 48.5 | 22.42 |
| 12 | −80.663 | (Variable) | | | 22.27 |
| 13 | ∞ | 1.00 | | | 17.51 |
| 14 | −1,227.899 | 0.80 | 1.77250 | 49.6 | 16.28 |
| 15 | 31.173 | 2.34 | | | 15.91 |
| 16 | −39.901 | 0.80 | 1.69680 | 55.5 | 15.94 |
| 17 | 28.311 | 2.92 | 1.84666 | 23.8 | 16.50 |
| 18 | −179.014 | (Variable) | | | 16.70 |
| 19 (Stop) | ∞ | (Variable) | | | 16.49 |
| 20 | ∞ | (Variable) | | | 17.23 |
| 21 | 34.210 | 4.81 | 1.43875 | 94.9 | 17.41 |
| 22 | −22.290 | 0.15 | | | 17.40 |
| 23 | −47.218 | 3.90 | 1.56732 | 42.8 | 16.99 |
| 24 | −14.789 | 1.10 | 1.85026 | 32.3 | 16.96 |
| 25 | −45.788 | (Variable) | | | 17.72 |
| 26 | −61.667 | 1.00 | 1.84666 | 23.8 | 18.09 |
| 27 | 2,656.197 | (Variable) | | | 18.62 |
| 28 | 29.750 | 5.34 | 1.49700 | 81.5 | 22.08 |
| 29 | −44.557 | 0.15 | | | 22.37 |
| 30 | 712.118 | 1.40 | 1.91082 | 35.3 | 22.35 |
| 31 | 19.346 | 4.88 | 1.78472 | 25.7 | 22.25 |
| 32* | 83.456 | | | | 22.43 |

Aspherical surface data

First surface

K = 0.00000e+000   A4 = 1.70800e−005   A6 = −3.44155e−008
A8 = 4.53701e−011  A10 = −3.26163e−014  A12 = 9.94081e−018

Third surface

K = 0.00000e+000    A4 = 2.22219e−005   A6 = 2.37055e−008
A8 = −1.55335e−010  A10 = 1.39414e−013

Fourth surface

K = 0.00000e+000    A4 = 3.07204e−005   A6 = 4.00756e−009
A8 = −2.24106e−010  A10 = 3.11696e−013   A12 = −8.42451e−017

Seventh surface

K = 0.00000e+000    A4 = −5.78948e−006  A6 = 6.56533e−009
A8 = −7.64738e−011  A10 = 1.86535e−013

Thirty-second surface

K = 0.00000e+000   A4 = 1.56394e−005   A6 = 1.05029e−008
A8 = 2.39788e−011  A10 = 8.06022e−014

Various data
Zoom ratio 3.91

| | Wide angle | Intermediate | Telephoto |
|---|---|---|---|
| Focal length | 17.40 | 35.00 | 68.00 |
| F-number | 3.33 | 4.24 | 6.03 |
| Half angle of view (degrees) | 51.19 | 31.72 | 17.65 |
| Image height | 21.64 | 21.64 | 21.64 |
| Entire length of zoom lens | 168.42 | 153.33 | 168.42 |
| BF | 38.34 | 53.18 | 83.69 |
| d6 | 39.99 | 12.25 | 1.00 |

-continued

| Unit mm | | | |
|---|---|---|---|
| d12 | 1.50 | 7.54 | 14.08 |
| d18 | 12.67 | 9.81 | 1.31 |
| d19 | 0.42 | 1.18 | 1.80 |
| d20 | 7.00 | 0.00 | 0.00 |
| d25 | 0.80 | 1.03 | 1.00 |
| d27 | 2.96 | 3.59 | 0.80 |

Zoom lens unit data

| Unit | First surface | Focal length | Lens unit structure length | Front principal point position | Rear principal point position |
|---|---|---|---|---|---|
| 1 | 1 | −23.27 | 23.29 | 2.37 | −16.43 |
| 2 | 7 | 26.24 | 10.85 | 3.52 | −3.18 |
| 3 | 13 | −30.48 | 7.86 | 1.59 | −4.29 |
| 4 | 21 | 50.81 | 9.96 | 1.66 | −5.07 |
| 5 | 26 | −71.17 | 1.00 | 0.01 | −0.53 |
| 6 | 28 | 69.48 | 11.77 | −3.54 | −10.13 |

(Numerical Data 3)

| Unit mm | | | | |
|---|---|---|---|---|
| Surface data | | | | |
| Surface number | r | d | nd | vd | Effective diameter |
| 1* | 1,084.469 | 2.50 | 1.88300 | 40.8 | 56.21 |
| 2 | 21.813 | 14.52 | | | 39.24 |
| 3* | −48.199 | 2.00 | 1.58313 | 59.4 | 39.16 |
| 4* | 561.232 | 2.81 | | | 38.75 |
| 5 | 51.960 | 4.09 | 1.85478 | 24.8 | 38.69 |
| 6 | 213.703 | (Variable) | | | 38.25 |
| 7* | 40.774 | 2.12 | 1.76385 | 48.5 | 20.17 |
| 8 | 166.001 | 1.10 | 1.85478 | 24.8 | 20.11 |
| 9 | 34.376 | 3.16 | 1.60311 | 60.6 | 20.00 |
| 10 | −107.825 | 0.15 | | | 20.07 |
| 11 | 601.187 | 1.96 | 1.76385 | 48.5 | 20.06 |
| 12 | −75.283 | (Variable) | | | 20.03 |
| 13 | ∞ | 1.00 | | | 17.60 |
| 14 | −99.694 | 0.80 | 1.77250 | 49.6 | 17.39 |
| 15 | 200.761 | 1.58 | | | 17.23 |
| 16 | −40.224 | 0.80 | 1.69680 | 55.5 | 17.17 |
| 17 | 27.028 | 3.00 | 1.84666 | 23.8 | 17.58 |
| 18 | −846.135 | (Variable) | | | 17.74 |
| 19 (Stop) | ∞ | (Variable) | | | 17.69 |
| 20 | ∞ | (Variable) | | | 18.31 |
| 21 | 35.591 | 5.96 | 1.43875 | 94.9 | 18.53 |
| 22 | −22.048 | 0.15 | | | 18.64 |
| 23 | −52.502 | 4.57 | 1.56732 | 42.8 | 18.26 |
| 24 | −14.145 | 1.10 | 1.85026 | 32.3 | 18.35 |
| 25 | −76.958 | (Variable) | | | 19.58 |
| 26 | 35.779 | 5.76 | 1.49700 | 81.5 | 22.45 |
| 27 | −30.590 | (Variable) | | | 22.63 |
| 28 | −94.603 | 1.40 | 1.91082 | 35.3 | 22.05 |
| 29 | 24.777 | 3.84 | 1.78472 | 25.7 | 21.97 |
| 30* | 78.225 | | | | 22.09 |

Aspherical surface data

First surface

K = 0. 00000e+000   A4 = 1.82387e−005   A6 = −3.59579e−008
A8 = 4.56631e−011   A10 = −3.17843e−014   A12 = 9.48005e−018

Third surface

K = 0.00000e+000   A4 = 2.10364e−005   A6 = 2.19620e−008
A8 = −1.46769e−010   A10 = 1.16028e−013

Fourth surface

K = 0. 00000e+000   A4 = 3.05338e−005   A6 = −3.23851e−010
A8 = −2.35501e−010   A10 = 3.18960e−013   A12 = −7.73326e−017

-continued

| Unit mm | | |
|---|---|---|
| Seventh surface | | |

K = 0. 00000e+000   A4 = −3.85934e−006   A6 = 8.83188e−009
A8 = −1.32403e−010   A10 = 4.41636e−013

Thirtieth surface

K = 0. 00000e+000   A4 = 1.98233e−005   A6 = 2.57991e−008
A8 = −7.68344e−011   A10 = 5.66997e−013

Various data
Zoom ratio 3.56

| | Wide angle | Intermediate | Telephoto |
|---|---|---|---|
| Focal length | 16.30 | 35.10 | 58.00 |
| F-number | 3.23 | 4.28 | 5.99 |
| Half angle of view (degrees) | 53.01 | 31.65 | 20.46 |
| Image height | 21.64 | 21.64 | 21.64 |
| Entire length of zoom lens | 168.43 | 153.18 | 168.42 |
| BF | 38.25 | 55.24 | 83.36 |
| d6 | 46.87 | 11.51 | 1.00 |
| d12 | 1.50 | 11.22 | 14.10 |
| d18 | 3.22 | 6.13 | 1.45 |
| d19 | 3.31 | 2.15 | 1.80 |
| d20 | 7.00 | 0.00 | 0.00 |
| d25 | 3.14 | 1.35 | 0.80 |
| d27 | 0.80 | 1.23 | 1.56 |

Zoom lens unit data

| Unit | First surface | Focal length | Lens unit structure length | Front principal point position | Rear principal point position |
|---|---|---|---|---|---|
| 1 | 1 | −26.31 | 25.91 | 0.28 | −23.28 |
| 2 | 7 | 35.74 | 8.48 | 2.31 | −2.90 |
| 3 | 13 | −44.46 | 7.18 | 1.83 | −3.29 |
| 4 | 21 | 76.46 | 11.77 | −1.53 | −9.09 |
| 5 | 26 | 34.17 | 5.76 | 2.14 | −1.83 |
| 6 | 28 | −39.72 | 5.24 | 1.30 | −1.54 |

TABLE 1

| | Embodiment 1 | Embodiment 2 | Embodiment 3 |
|---|---|---|---|
| Lens unit type | NPNPP | NPNPNP | NPNPPN |
| fw | 17.400 | 17.398 | 16.300 |
| fT | 67.984 | 67.999 | 58.000 |
| f1 | −23.363 | −23.267 | −26.305 |
| f2 | 26.675 | 26.244 | 35.738 |
| f3 | −29.492 | −30.481 | −44.457 |
| f4S | 69.513 | 50.806 | 76.458 |
| fRw | 134.377 | 3,016.716 | 143.069 |
| Conditional Expression' (1) fw/fRw | 0.129 | 0.006 | 0.114 |
| Conditional Expression' (2) f4S/fw | 3.995 | 2.920 | 4.691 |
| Conditional Expression' (3) −f1/fw | 1.343 | 1.337 | 1.614 |
| Conditional Expression' (4) f2/fw | 1.533 | 1.508 | 2.192 |
| Conditional Expression' (5) −f3/fw | 1.695 | 1.752 | 2.727 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-057115, filed Mar. 23, 2017, which is hereby incorporated by reference herein in its entirety.

What is claimed is:

1. A zoom lens, comprising, in order from an object side to an image side:
   a first lens unit having a negative refractive power;
   a second lens unit having a positive refractive power;
   a third lens unit having a negative refractive power;
   a fourth lens unit having a positive refractive power; and
   a rear lens group including at least one lens unit,
   wherein an interval between each pair of adjacent lens units is changed for zooming,
   wherein the third lens unit is configured to move for focusing,
   wherein at least a part of the fourth lens unit is a lens system IS configured to move in a direction including a component of a direction perpendicular to an optical axis for image stabilization, and
   wherein the following conditional expression is satisfied:

$1.0 < -f1/fw < 2.0$, where f1 represents a focal length of the first lens unit, and fw represents a focal length of the zoom lens at a wide-angle end.

2. The zoom lens according to claim 1, wherein the second lens unit is configured to move for focusing.

3. The zoom lens according to claim 1, wherein the second lens unit and the third lens unit are configured to move toward the image side for focusing from infinite object distance to a closest object distance at a wide-angle end.

4. The zoom lens according to claim 1, wherein the second lens unit is configured to move toward the image side for focusing from infinite object distance to a closest object distance at a telephoto end, and the third lens unit is configured to move toward the object side for focusing from infinite object distance to a closest object distance at a telephoto end.

5. The zoom lens according to claim 1, wherein the following conditional expression is satisfied:

$-0.1 < fw/fRw < 0.3$, where fRw represents a focal length of the rear lens group at a wide-angle end.

6. The zoom lens according to claim 1, wherein the following conditional expression is satisfied:

$2.0 < f4S/fw < 6.0$, where f4S represents a focal length of the lens system IS.

7. The zoom lens according to claim 1, wherein the following conditional expression is satisfied:

$1.0 < f2/fw < 3.0$, where f2 represents a focal length of the second lens unit.

8. The zoom lens according to claim 1, wherein the following conditional expression is satisfied:

$1.0 < -f3/fw < 4.0$, where f3 represents a focal length of the third lens unit.

9. The zoom lens according to claim 1, wherein the rear lens group includes a lens unit LP having a positive refractive power arranged closest to the object side among at least one positive lens unit included in the rear lens group, and an interval between the fourth lens unit and the lens unit LP is reduced for zooming from a wide-angle end to a telephoto end.

10. The zoom lens according to claim 1, wherein the fourth lens unit includes two positive lenses and one negative lens.

11. The zoom lens according to claim 1, wherein the rear lens group includes a lens unit LP having a positive refractive power arranged closest to the object side among at least one positive lens unit included in the rear lens group, the lens unit LP including two positive lenses and one negative lens.

12. The zoom lens according to claim 1, wherein the rear lens group consists of a fifth lens unit having a positive refractive power.

13. The zoom lens according to claim 1, wherein the rear lens group consists of, in order from the object side to the image side:
    a fifth lens unit having a negative refractive power; and
    a sixth lens unit having a positive refractive power.

14. The zoom lens according to claim 1, wherein the rear lens group consists of, in order from the object side to the image side:
    a fifth lens unit having a positive refractive power; and
    a sixth lens unit having a negative refractive power.

15. An image pickup apparatus, comprising:
    a zoom lens according to claim 1; and
    an image pickup element, which is configured to receive an image formed by the zoom lens.

16. A zoom lens, comprising, in order from an object side to an image side:
    a first lens unit having a negative refractive power;
    a second lens unit having a positive refractive power;
    a third lens unit having a negative refractive power;
    a fourth lens unit having a positive refractive power; and
    a rear lens group including at least one lens unit,
    wherein an interval between each pair of adjacent lens units is changed for zooming,
    wherein the second lens unit and the third lens unit is configured to move for focusing, and
    wherein at least a part of the fourth lens unit is a lens system IS configured to move in a direction including a component of a direction perpendicular to an optical axis for image stabilization.

17. A zoom lens, comprising, in order from an object side to an image side:
    a first lens unit having a negative refractive power;
    a second lens unit having a positive refractive power;
    a third lens unit having a negative refractive power;
    a fourth lens unit having a positive refractive power;
    a rear lens group including at least one lens unit,
    wherein an interval between each pair of adjacent lens units is changed for zooming,
    wherein the third lens unit is configured to move for focusing,
    wherein at least a part of the fourth lens unit is a lens system IS configured to move in a direction including a component of a direction perpendicular to an optical axis for image stabilization, and
    wherein the rear lens group includes a lens unit LP having a positive refractive power arranged closest to the object side among at least one positive lens units included in the rear lens group, and an interval between the fourth lens unit and the lens unit LP is reduced for zooming from a wide-angle end to a telephoto end.

18. A zoom lens, comprising, in order from an object side to an image side:
a first lens unit having a negative refractive power;
a second lens unit having a positive refractive power;
a third lens unit having a negative refractive power;
a fourth lens unit having a positive refractive power; and
a rear lens group including at least one lens unit,
wherein an interval between each pair of adjacent lens units is changed for zooming,
wherein the third lens unit is configured to move for focusing,
wherein at least a part of the fourth lens unit is a lens system IS configured to move in a direction including a component of a direction perpendicular to an optical axis for image stabilization, and
wherein the rear lens group includes a lens unit LP having a positive refractive power arranged closest to the object side among at least one positive lens units included in the rear lens group, the lens unit LP including two positive lenses and one negative lens.

19. A zoom lens, comprising, in order from an object side to an image side:
a first lens unit having a negative refractive power;
a second lens unit having a positive refractive power;
a third lens unit having a negative refractive power;
a fourth lens unit having a positive refractive power; and
a rear lens group consisting of a fifth lens unit having a positive refractive power and a sixth lens unit having a negative refractive power,
wherein an interval between each pair of adjacent lens units is changed for zooming,
wherein the third lens unit is configured to move for focusing, and
wherein at least a part of the fourth lens unit is a lens system IS configured to move in a direction including a component of a direction perpendicular to an optical axis for image stabilization.

* * * * *

UNITED STATES PATENT AND TRADEMARK OFFICE
CERTIFICATE OF CORRECTION

PATENT NO. : 10,495,861 B2  
APPLICATION NO. : 15/924748  
DATED : December 3, 2019  
INVENTOR(S) : Shigenobu Sugita Page 1 of 1

It is certified that error appears in the above-identified patent and that said Letters Patent is hereby corrected as shown below:

On the Title Page

Item (30) should read as:  
(30) Foreign Application Priority Data  
Mar. 23, 2017 (JP) .......................... 2017-057115

Signed and Sealed this  
Twenty-eighth Day of January, 2020

Andrei Iancu  
*Director of the United States Patent and Trademark Office*